(12) United States Patent
Garn

(10) Patent No.: US 12,194,803 B2
(45) Date of Patent: Jan. 14, 2025

(54) INVERTIBLE STABILIZER BAR AND SYSTEM INCORPORATING THE SAME

(71) Applicant: Ford Global Technologies, LLC, Dearborn, MI (US)

(72) Inventor: Matthew Garn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/099,644

(22) Filed: Jan. 20, 2023

(65) Prior Publication Data
US 2023/0158853 A1 May 25, 2023

Related U.S. Application Data

(63) Continuation of application No. 17/329,489, filed on May 25, 2021, now Pat. No. 11,565,567.

(51) Int. Cl.
*B60G 21/02* (2006.01)
*B60G 21/055* (2006.01)

(52) U.S. Cl.
CPC ....... *B60G 21/0558* (2013.01); *B60G 21/026* (2013.01); *B60G 2202/42* (2013.01); *B60G 2204/82* (2013.01)

(58) Field of Classification Search
CPC ............... B60G 21/026; B60G 21/055; B60G 21/0553; B60G 21/0555; B60G 21/0556; B60G 21/0558; B60G 2202/135; B60G 2202/1351; B60G 2202/136; B60G 2202/1362; B60G 2202/42; B60G 2202/43; B60G 2202/44; B60G 2204/419; B60G 2204/421; B60G 2204/82
See application file for complete search history.

(56) References Cited

U.S. PATENT DOCUMENTS

| | | | |
|---|---|---|---|
| 4,962,943 A | 10/1990 | Lin | |
| 6,022,030 A | 2/2000 | Fehring | |
| 6,550,788 B2 | 4/2003 | Schmidt | |
| 6,951,341 B1 | 10/2005 | Beetz | |
| 7,500,686 B2 | 3/2009 | Munster | |
| 10,464,582 B2 | 11/2019 | Sato et al. | |

(Continued)

FOREIGN PATENT DOCUMENTS

| | | | | |
|---|---|---|---|---|
| DE | 10239657 B3 * | 4/2004 | ......... | B60G 21/0555 |
| DE | 102017105095 A1 | 9/2018 | | |

(Continued)

*Primary Examiner* — Jason D Shanske
*Assistant Examiner* — Daniel M. Keck
(74) *Attorney, Agent, or Firm* — Burr & Forman LLP; Lorne Forsythe

(57) ABSTRACT

A suspension assembly for a vehicle may include a first stabilizer bar operably coupled to a first wheel on a first side of the vehicle, a second stabilizer bar operably coupled to a second wheel on a second side of the vehicle, and an chassis coupler comprising an inverter housing and an actuator assembly. The actuator assembly may be operable to arrange the first stabilizer bar and the second stabilizer bar in a selected one of a connected state, a disconnected state, and an inverted state. The inverter housing may be alternately constrained to one of the first stabilizer bar or the chassis coupler based on a position of the actuator assembly to define each of the connected state, the disconnected state and the inverted state.

20 Claims, 23 Drawing Sheets

(56) References Cited

U.S. PATENT DOCUMENTS

| | | |
|---|---|---|
| 2008/0106055 A1 | 5/2008 | Pinkos |
| 2009/0058020 A1* | 3/2009 | Ersoy ................ B60G 21/0556 |
| | | 280/5.511 |
| 2013/0291664 A1 | 11/2013 | Freund |
| 2015/0151604 A1 | 6/2015 | Park |
| 2021/0122208 A1 | 4/2021 | Dawkes |
| 2023/0060076 A1* | 2/2023 | Kraus ................ B60G 21/0556 |
| 2024/0116351 A1* | 4/2024 | Gurski ................ B60B 35/004 |

FOREIGN PATENT DOCUMENTS

| | | | |
|---|---|---|---|
| EP | 1759895 A1 | 3/2007 | |
| EP | 3594030 A1 | 1/2020 | |
| GB | 2454013 A | 4/2009 | |
| WO | WO-2006034698 A1 * | 4/2006 | ......... B60G 21/0556 |

\* cited by examiner

INVERTIBLE STABILIZER BAR AND SYSTEM INCORPORATING THE SAME

CROSS REFERENCE TO RELATED APPLICATIONS

This application is a continuation of U.S. application Ser. No. 17/329,489 filed on May 25, 2021, the entire contents of which are hereby incorporated by reference.

TECHNICAL FIELD

Example embodiments generally relate to vehicle suspension and, more particularly, relate to a suspension system that employs a stabilizer or anti-roll bar (ARB) that is capable of being inverted.

BACKGROUND

Off-road and on-road performance targets are often difficult to meet with conventional suspension systems. In this regard, for example, soft suspension with high suspension articulation is desirable at low speeds for off-road driving, but high roll-stiffness to reduce roll gain of the vehicle is desirable for improved handling for on-road driving. Additionally, high levels of understeer are required to achieve low yaw response at high speeds, whereas high yaw gains are preferred at low speeds. Given that the suspension characteristics desired for off-road and on-road driving may be contradictory, the provision of desirable characteristics for both on-road and off-road driving is a significant challenge.

A stabilizer bar (or ARB) increases the roll rate of a vehicle suspension system to provide improved handling characteristics on-road, at higher speeds, or during significant maneuvering. The increased roll rate is, however, not advantageous for off-road driving scenarios since the stabilizer bar directly resists the undulating terrain to hinder the ability of the suspension system to articulate independently.

One way this challenge is often dealt with is by providing a disconnect system for the stabilizer bar or ARB, which is also often referred to as a sway bar, roll bar or the like. An ARB disconnect system typically allows an ARB to provide a high degree of roll-stiffness when connected, but improves suspension articulation when disconnected. However, typical ARB disconnect systems can be complicated, introduce undesirable lash, or be difficult to reengage when manually operable. Additionally, some vehicles may use increased spring rates to achieve higher roll rates or use increased spring rates or preloads to achieve high ground clearance. In these cases, a disconnected stabilizer bar alone may not allow full articulation of the suspension.

Thus, there remains a need to improve suspension designs to provide improved responsiveness to different driving conditions to maintain high degrees of driver confidence and enjoyment of the driving experience.

BRIEF SUMMARY OF SOME EXAMPLES

In accordance with an example embodiment, a suspension assembly for a vehicle suspension system may be provided. The suspension assembly may include a first stabilizer bar operably coupled to a first wheel on a first side of the vehicle, a second stabilizer bar operably coupled to a second wheel on a second side of the vehicle, an inverter housing, an actuator assembly and a chassis coupler. The actuator assembly may be operable to arrange the first stabilizer bar and the second stabilizer bar in a selected one of a connected state, a disconnected state, and an inverted state. The inverter housing may be alternately constrained to one of the first stabilizer bar or the chassis coupler based on a position of the actuator assembly to define each of the connected state, the disconnected state and the inverted state.

In another example embodiment, a vehicle suspension system may be provided. The vehicle suspension system may include a chassis, a first wheel operably coupled to the chassis via a first suspension assembly, a second wheel operably coupled o the chassis via a second suspension assembly, and a stabilizer assembly. The suspension assembly may include a first stabilizer bar operably coupled to the first wheel, a second stabilizer bar operably coupled to the second wheel, an inverter housing, an actuator assembly and a chassis coupler. The actuator assembly may be operable to arrange the first stabilizer bar and the second stabilizer bar in a selected one of a connected state, a disconnected state, and an inverted state. The inverter housing may be alternately constrained to one of the first stabilizer bar or the chassis coupler based on a position of the actuator assembly to define each of the connected state, the disconnected state and the inverted state.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
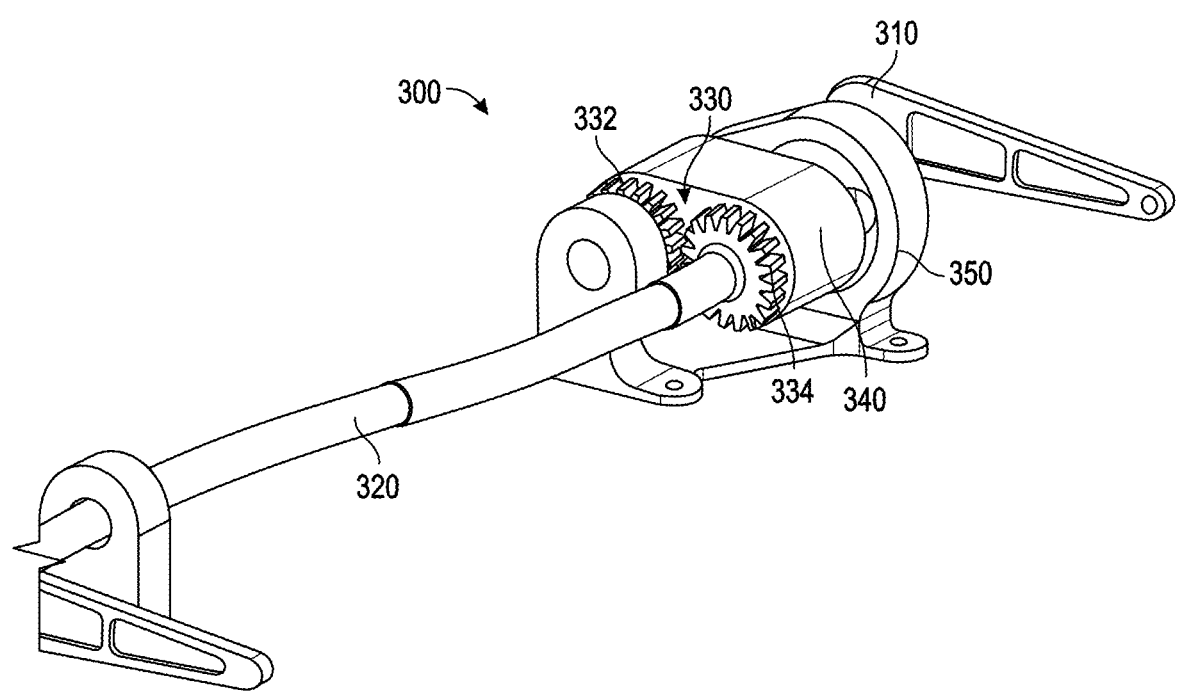
FIG. 6 is a perspective view of a stabilizer assembly in accordance with an example embodiment.

FIG. 7, which is defined by FIGS. 7A, 7B, 7C and 7D, illustrates the stabilizer assembly of FIG. 6 in a connected state in accordance with an example embodiment;

FIG. 8, which is defined by FIGS. 8A, 8B, 8C and 8D, illustrates the stabilizer assembly of FIG. 6 in a disconnected state in accordance with an example embodiment;

FIG. 9, which is defined by FIGS. 9A, 9B, 9C and 9D, illustrates the stabilizer assembly of FIG. 6 in an inverted state in accordance with an example embodiment;

FIG. 10, which is defined by FIGS. 10A, 10B, 10C, 10D, 10E and 10F, illustrates an alternative structure for a stabilizer assembly in connected, disconnected and inverted states in accordance with an example embodiment; and FIG. 11, which is defined by FIGS. 11A, 11B, 11C and 11D, illustrates an alternative structure for a single, three-position actuator in connected, disconnected and inverted states in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, stabilizer bars are useful in some situations (e.g., on-road applications), but may be desirably disconnected in others (e.g., off-road applications). But these two basic options do not optimize performance for all scenarios. Other situations may exist in which it is actually beneficial to invert the function of the stabilizer bar. Accordingly, example embodiments provide a stabilizer assembly that has three distinct configurations or states including a connected state, a disconnected state, and an inverted state. All three configurations are achieved via splitting the stabilizer bar into two components that are operably coupled to each other at a stabilizer assembly. The stabilizer assembly further includes an inverter housing, an actuator assembly and a chassis coupler. The actuator assembly is operable to change the physical connections between the inverter housing, the chassis coupler, and the two parts of the stabilizer bar (which may be considered as separate bars or separate bar portions) to achieve all three configurations.

Figure 1:
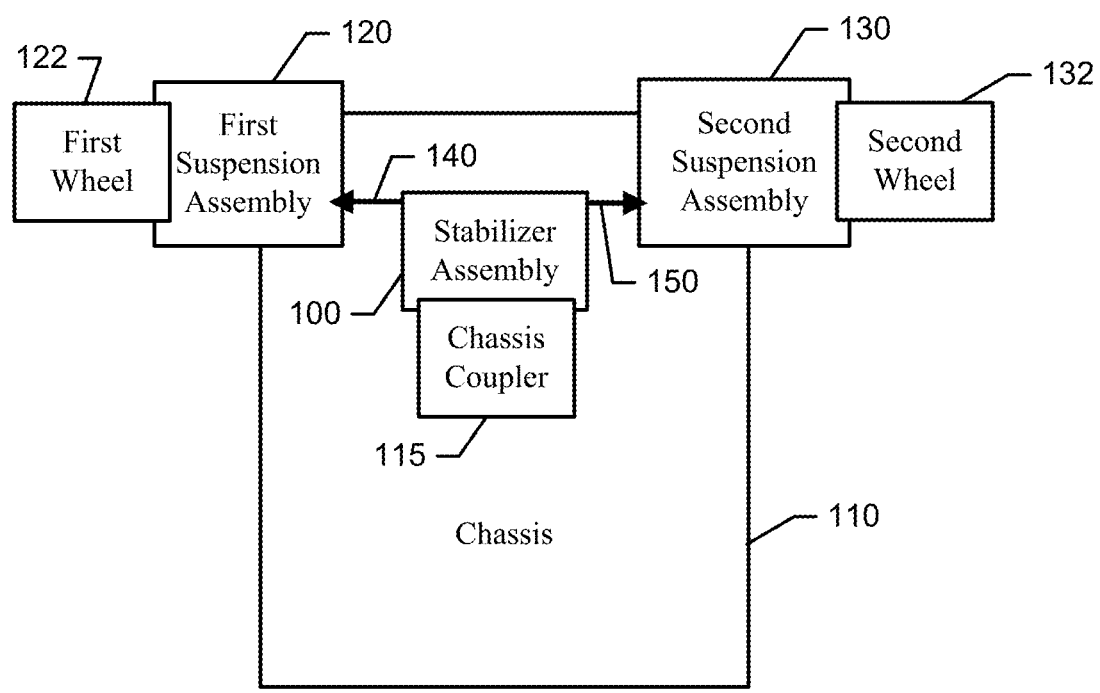
FIG. 1 illustrates a block diagram of a suspension system of a vehicle having a stabilizer assembly of an example embodiment.

FIG. 1 illustrates a block diagram of a stabilizer assembly 100 of an example embodiment. The stabilizer assembly 100 may be operably coupled (and in some cases affixed) to a chassis 110 of a vehicle via a chassis coupler 115. The chassis coupler 115 may be portion of the chassis 110 in some cases (e.g., a portion of the chassis 110 that is structurally adapted to interface with the stabilizer assembly 100). However, in other examples, the chassis coupler 115 may be a bracket, series of brackets, or other structural assembly that connects the stabilizer assembly 100 (or components thereof) to the chassis 110. A first suspension assembly 120 may support a first wheel 122, and a second suspension assembly 130 may support a second wheel 132. The first and second suspension assemblies 120 and 130 may substantially mirror each other in arrangement and may form portions of the suspension system of an example embodiment. The first and second suspension assemblies 120 and 130 may take any suitable form and include components associated therewith. Thus, for example, the first and second suspension assemblies 120 and 130 may include shocks, springs, dampers, linkages and/or the like, in any of various arrangements that allow relative motion between the chassis 110 and the respective wheels (i.e. the first and second wheels 122 and 132).

As shown in FIG. 1, the first suspension assembly 120 may be operably coupled to the stabilizer assembly 100 by a first stabilizer bar 140. The second suspension assembly 130 may be operably coupled to the stabilizer assembly 100 by a second stabilizer bar 150. As noted above, the first and second stabilizer bars 140 and 150 could be considered to be portions of a single stabilizer bar when in the connected state. However, the first and second stabilizer bars 140 and 150 are not integrally formed or continuous, and are capable of being disconnected or decoupled from each other to define the disconnected state or being operably coupled to each other such that forces exerted on one of the first or second stabilizer bars 140 and 150 are inverted when coupled to the other of the second or first stabilizer bars 150 and 140 (e.g., to define the inverted state).

Figure 2:
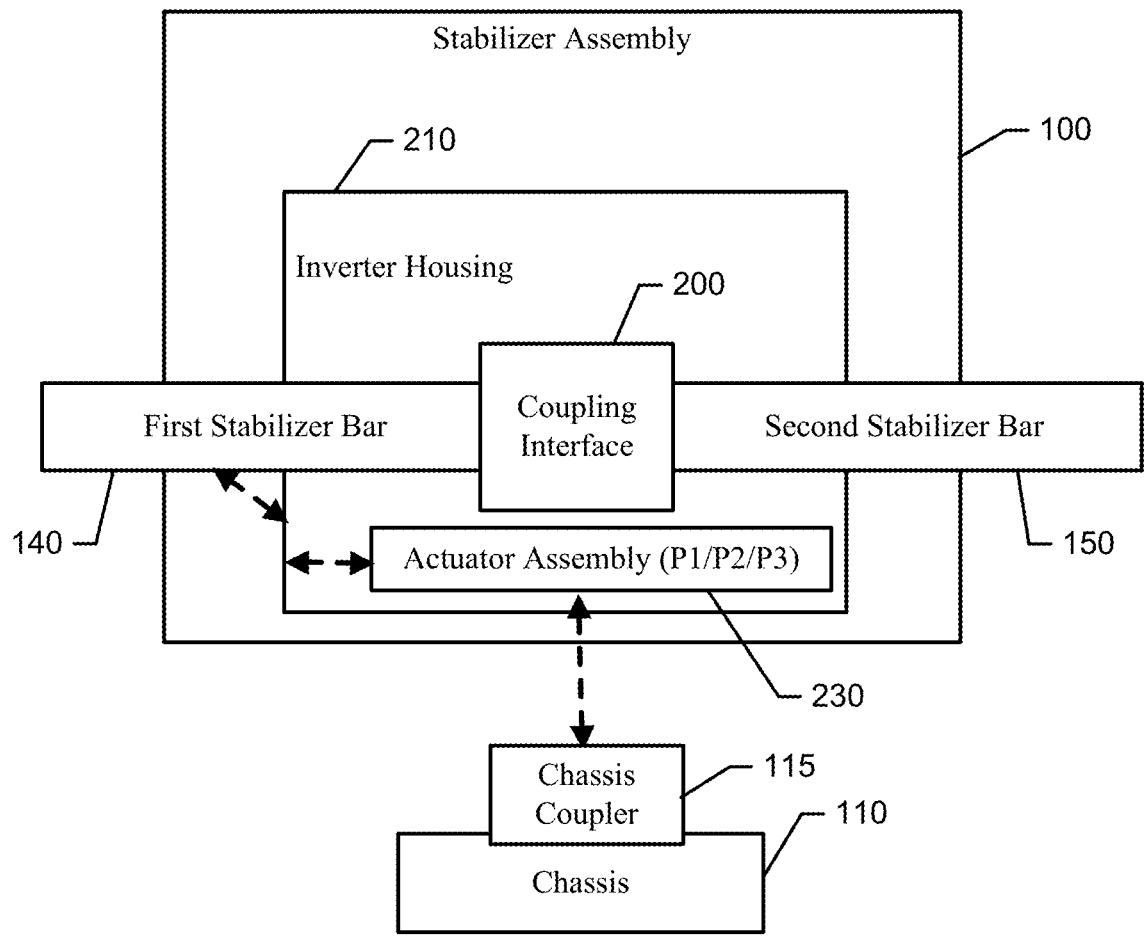
FIG. 2 illustrates a block diagram of the stabilizer assembly in greater detail in accordance with an example embodiment.

Based on the description above, it can be appreciated that the stabilizer assembly 100 of an example embodiment may have at least three distinct states or configurations including the connected state, the disconnected state, and the inverted state. The structures or components that are used to define the three states or configurations of the stabilizer assembly 100 are shown in greater detail in FIG. 2. Referring now to FIG. 2, the first and second stabilizer bars 140 and 150 may be operably coupled to each other via a coupling interface 200. The coupling interface 200 may include intermeshing gear teeth in some cases. However, other forms of mechanical coupling are also possible, such as a linkage. The coupling interface 200 of some example embodiments may be provided within an inverter housing 210. In some examples, the inverter housing 210 may be operably coupled to an the chassis coupler 115. In some cases, the inverter housing 210 may be a physically distinct structure from the chassis coupler 115, but may be indirectly supported by, or even retained within, the chassis coupler 115.

An actuator assembly 230 may also be operably coupled to the inverter housing 210 and the chassis coupler 115. Moreover, in some cases, the actuator assembly 230 may also be considered to be a portion of, or subcomponent of, the chassis coupler 115. The actuator assembly 230 may be used to transition the stabilizer assembly 100 between the various states (i.e., the connected, disconnected and inverted states) based on a position of various components of the actuator assembly 230 (e.g., the actuator or actuators thereof). In some examples, the actuator assembly 230 may be operated or actuated to change the state of connection between various other components to alternately constrain the movement of such components relative to each other, or leave such movement unconstrained. Thus, in the context of the present application, the term "constrained" should be understood to apply when two components are inhibited in relation to movement relative to each other. Thus, if component A is constrained to component B, then relative movement between components A and B is prevented. When component A is unconstrained relative to component B, then relative movement is possible between components A and B.

In an example embodiment, the inverter housing 210 may be operably coupled to the chassis coupler 115 to be moveable relative to the chassis coupler 115 when unconstrained. However, the inverter housing 210 may be immovable relative to the chassis coupler 115 when constrained relative to the chassis coupler 115. Moreover, as noted above, the inverter housing 210 may be alternately constrained or unconstrained relative to the chassis coupler 115 based on a position of the actuator assembly 230 (or subcomponents thereof). In some cases, the actuator assembly 230 may include linkages that reposition components (some examples of which are described below) when operated hydraulically, pneumatically, or electrically via operation of a hydraulic or pneumatic power supply, or an electric motor.

In the example of FIG. 2, a number of dashed double arrows are shown in order to illustrate the potential interactions related to constraining components relative to each other that may be possible in accordance with example embodiments. Thus, for example, the double arrows shown in FIG. 2 are meant to illustrate potential movement and therefore changes to the constraints of components in relation to enabling or preventing relative movement between various ones of the components to which the double arrows extend. As such, the actuator assembly 230, the inverter housing 210, the chassis coupler 115, and at least one (or potentially both) of the stabilizer bars (e.g., the first stabilizer bar 140 in this example) may be constrained or unconstrained relative to each other to define the various states or configuration (e.g., connected, disconnected, and inverted) of the stabilizer assembly 100. An example of each state is shown in FIGS. 3-5, along with solid lines that show constrained relationships or movements that may be provided with respect to various components.

Figure 3:
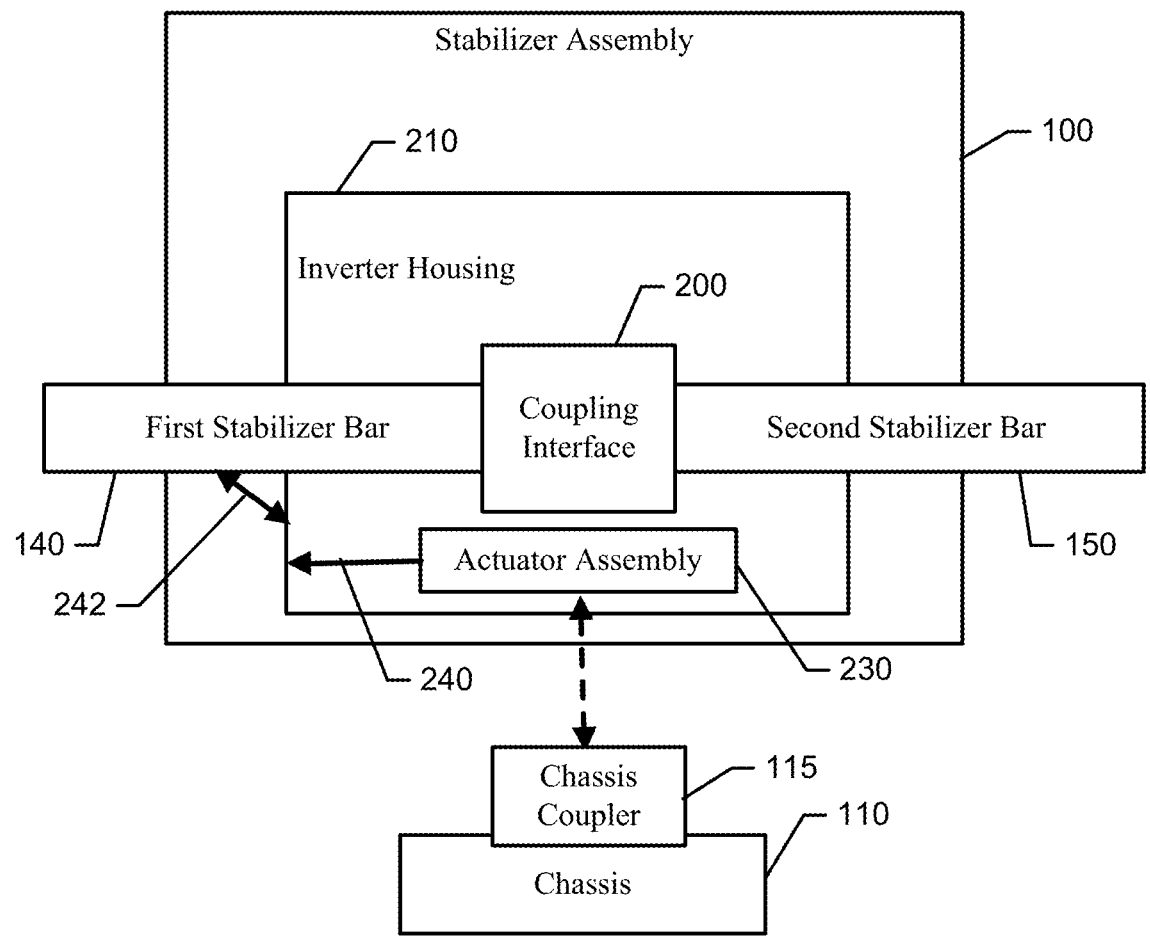
FIG. 3 illustrates the stabilizer assembly in a connected state in accordance with an example embodiment.

In this regard, referring first to FIG. 3, the actuator assembly 230 (or a portion thereof) may be actuated as shown by arrow 240. The actuation of the actuator assembly 230 may cause the inverter housing 210 to be constrained to the first stabilizer bar 140 as shown by double arrow 242. In this condition, which is the connected state, any force exerted on the first stabilizer bar 140 will be transmitted via the coupling interface 200, and constraint represented by double arrow 242, to the second stabilizer bar 150 in the same direction.

Figure 4:
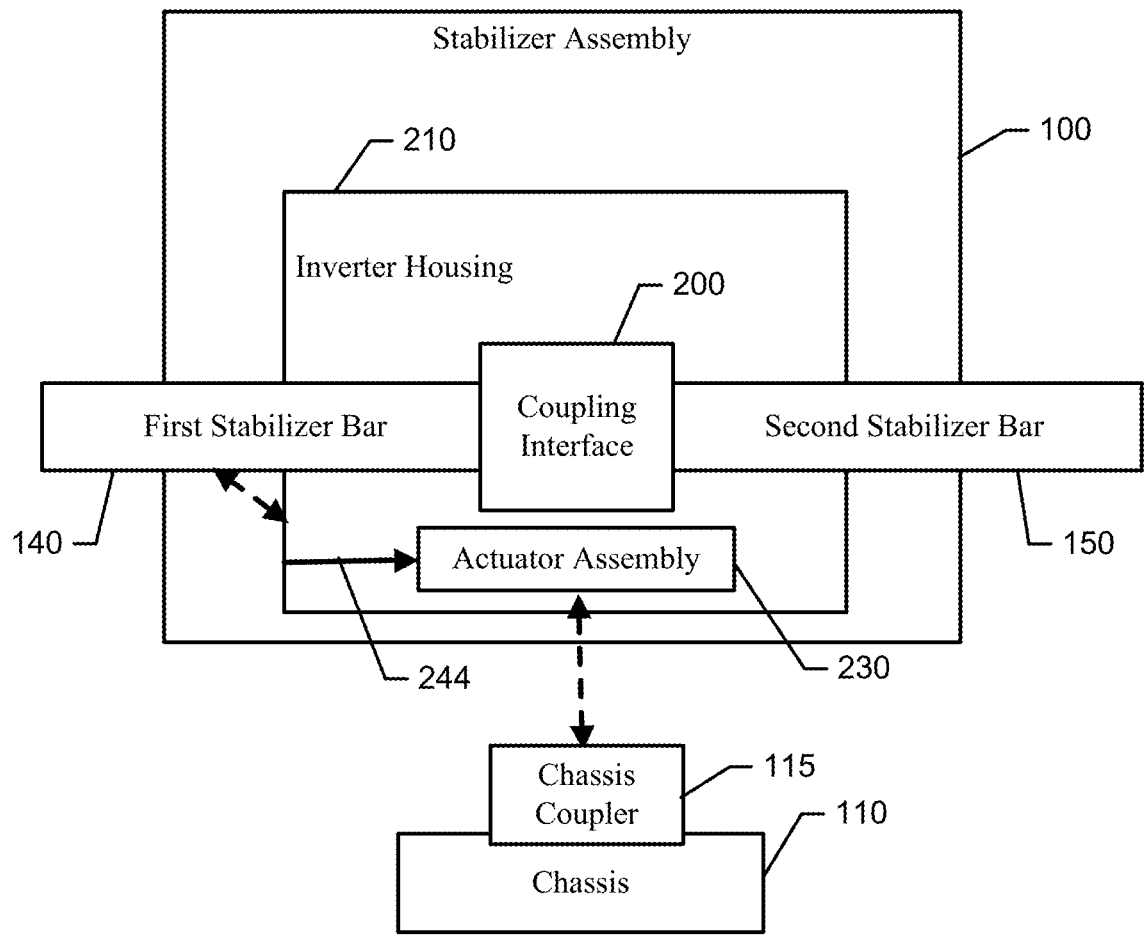
FIG. 4 illustrates the stabilizer assembly in a disconnected state in accordance with an example embodiment.

Alternatively, by moving the actuator assembly 230 (or a portion thereof) as shown by arrow 244 of FIG. 4, the inverter housing 210 may be unconstrained relative to the first stabilizer bar 140, and the stabilizer assembly 100 may be disconnected such that any force exerted on the first stabilizer bar 140 will not be transmitted via the coupling interface 200 to the second stabilizer bar 150 since the inverter housing 210 has freedom of movement (i.e., is unconstrained) relative to the chassis coupler 115 and the first and second stabilizer bars 140 and 150. In some cases, the movement of arrow 244 may be opposite the movement prescribed in FIG. 3. However, a relationship of opposite movements from FIG. 3 to FIG. 4 is not necessary.

Figure 5:
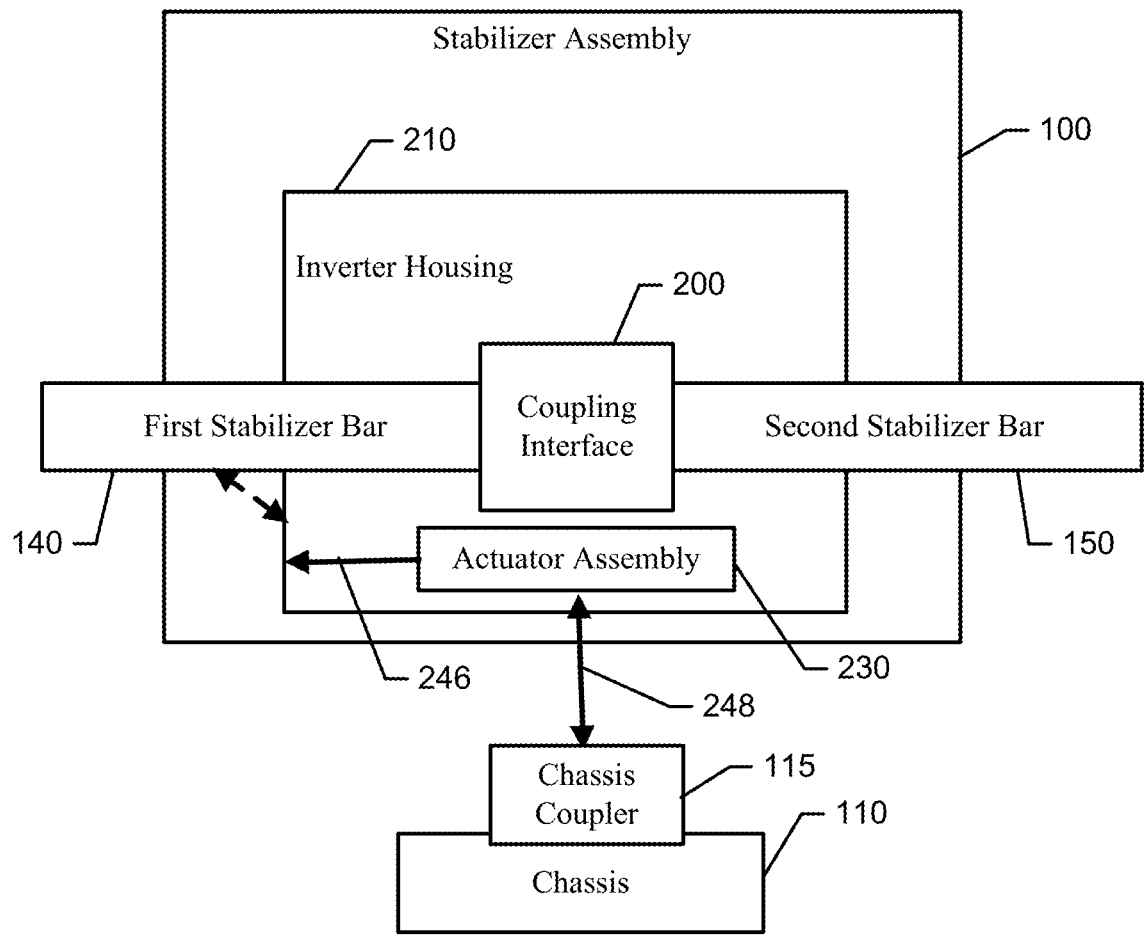
FIG. 5 illustrates the stabilizer assembly in an inverted state in accordance with an example embodiment.

As yet another alternative, as shown in FIG. 5, the actuator assembly 230 (or a portion thereof) may be moved as shown by arrow 246 to cause the inverter housing 210 to be constrained to the actuator assembly 230. Meanwhile, the actuator assembly 230 (or a different portion thereof) may be moved to also constrain the inverter housing 210 to the chassis coupler 115 as shown by double arrow 248. When so constrained, the stabilizer assembly 100 may be in the inverted state. In the inverted state, any force exerted on the first stabilizer bar 140 will be transmitted via the coupling interface 200 to the second stabilizer bar 150 in the opposite direction.

A specific example structure and more detailed description of how the example structures cooperate to alternatively shift between the connected state, disconnected state, and the inverted state are shown in FIGS. 6-9. In this regard, FIG. 6 is a perspective view of a stabilizer assembly 300 of an example embodiment. In this regard, the stabilizer assembly 300 is a specific example of the generic example of the stabilizer assembly 100 of FIGS. 1-5. FIG. 7, which is defined by FIGS. 7A, 7B, 7C and 7D, shows the stabilizer assembly 300 in the connected state. FIG. 8, which is defined by FIGS. 8A, 8B, 8C and 8D, shows the stabilizer assembly 300 in the disconnected state. FIG. 9, which is defined by FIGS. 9A, 9B, 9C and 9D, shows the stabilizer assembly 300 in the inverted state.

Referring first to FIG. 6, the stabilizer assembly 300 includes a short stabilizer bar 310 (e.g., an example of the first stabilizer bar 140) and a long stabilizer bar 320 (e.g., an example of the second stabilizer bar 150). Each of the short and long stabilizer bars 310 and 320 may be operably coupled to the chassis of the vehicle, and to each other via a coupling interface 330. The coupling interface 330 of this example includes a first fixed gear 332 at the short stabilizer bar 310 and a second fixed gear 334 at the long stabilizer bar 320. The first and second fixed gears 332 and 334 may be configured to mesh with each other as shown in FIG. 6. In some examples, the first and second fixed gears 332 and 334 may be symmetric and may have a 1:1 ratio. However, it should be appreciated that other structures could be used for the coupling interface 330. Moreover, any suitable mechanical interface may be provided for forming the coupling interface 330 and the ratio of movement defined by the mechanical interface need not necessarily be 1:1 and may also not be symmetric. In some cases, the structures forming the mechanical interface may be asymmetric, but may have a net 1:1 ratio.

The coupling interface 330, and particularly the first and second fixed gears 332 and 334, may be provided within inverter housing 340. In this regard, the inverter housing 340 may effectively keep the first and second fixed gears 332 and 334 in contact with each other so that rotational movement of one of the first or second fixed gears 332 or 334 causes corresponding movement of the other. The inverter housing 340 may also be provided proximate to, or within, chassis coupler 350. As shown in FIG. 6, portions of the chassis coupler 350 may extend to opposite lateral sides of the inverter housing 340 so that the inverter housing 340 is supported proximate to (or within) the chassis coupler 350 and is either movable relative thereto, or not, based on actuator positioning as described below. The chassis coupler 350 may have a fixed connection to the chassis, but be selectively constrained to the inverter housing 340 (and/or the long stabilizer bar 320) based on operation of the actuator assembly 230 as described below.

In this regard, as shown in FIGS. 7-9, the actuator assembly 230 of FIG. 2 may include a first actuator 360 and a second actuator 362. The first actuator 360, may be located inside the inverter housing 340, and may move along an axis of the short stabilizer bar 310 to alternately constrain the short stabilizer bar 310 to the inverter housing 340 or leave the short stabilizer bar 310 unconstrained relative to the short stabilizer bar 310. The second actuator 362 may be pivotally housed inside a portion of the chassis coupler 350, and may be rotated to alternately constrain the long stabilizer bar 320 to the chassis coupler 350 (thereby only allowing rotational movement of the long stabilizer bar 320 about its axis, but not allowing the axis itself to be moved) or leave the long stabilizer bar 320 unconstrained relative to the chassis coupler 350 (thereby allowing the axis of the long stabilizer bar 320 to move up and down within a slot 364 formed in the second actuator 362). Thus, motion of the inverter housing 340 relative to the chassis coupler 350 may be constrained directly by the actuator 362, or indirectly based on selectively constraining the long stabilizer bar 320 (or not) relative to movement in the slot 364 as shown in FIGS. 7-9.

Figure 7A:
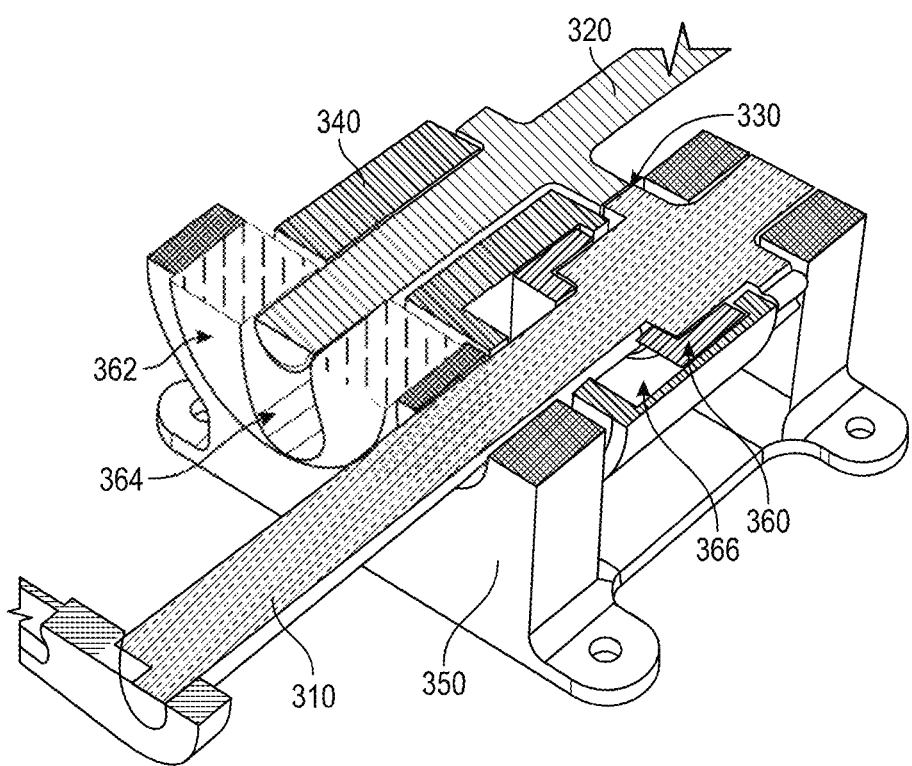
Figure 7B:
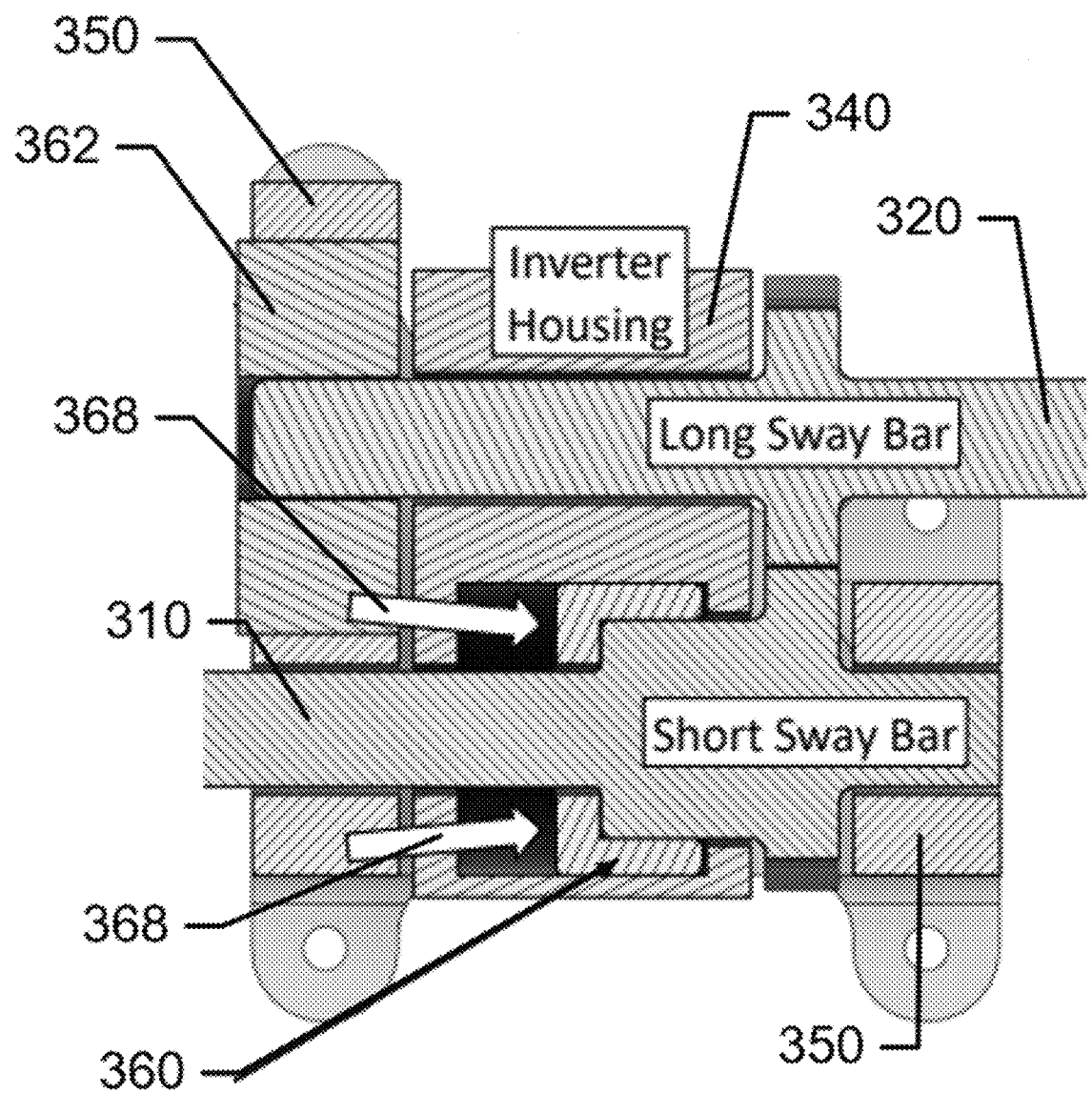
Figure 7C:
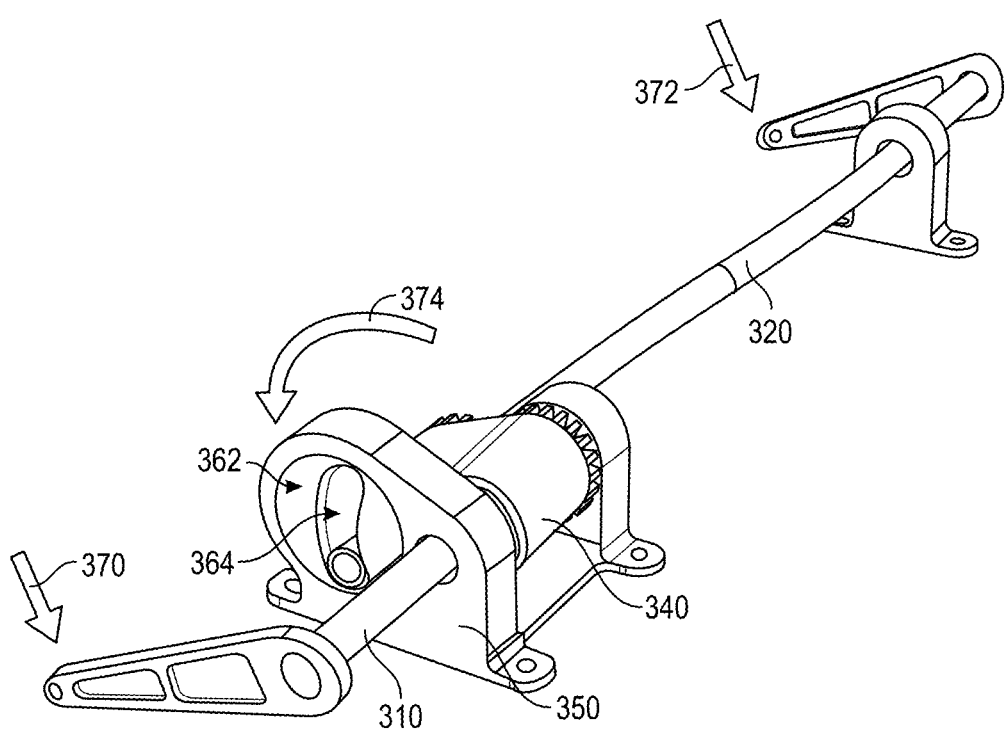

In this example, FIGS. 7A and 7B show cross section views through the chassis coupler 350, inverter housing 340, and the coupling interface 330 in the connected state. Referring to FIG. 7A, the second actuator 362 is positioned to leave the long stabilizer bar 320, and in effect also the inverter housing 340, unconstrained relative to the chassis coupler 350. Meanwhile, by moving the first actuator 360 from the space 366 in which the first actuator 360 sits within the inverter housing 340 while in the disconnected state in the direction of arrows 368, the first actuator 360 constrains the short stabilizer bar 310 to the inverter housing 340 as shown in FIG. 7B.

When the second actuator 362 is positioned to leave the long stabilizer bar 320 unconstrained relative to the chassis coupler 350 while the first actuator 360 constrains the short stabilizer bar 310 to the inverter housing 340, a force (see FIGS. 7C and 7D) exerted on the short stabilizer bar 310 in a first direction shown by arrow 370 results in a corresponding force in the first direction shown by arrow 372 on the long stabilizer bar 320. In this regard, the force associated with arrow 370 may cause the short stabilizer bar 310 to pivot about its axis. Since the short stabilizer bar 310 is constrained to the inverter housing 340 in this (connected) state, the pivoting of the short stabilizer bar 310 about its axis also carries the inverter housing 340 to pivot in the direction of arrow 374. This pivot of the inverter housing 340 carries the axis of the long stabilizer bar 320 in the slot 364 following the direction of arrow 374 and correspondingly pivoting the long stabilizer bar 320 in the direction of arrow 372, since the short stabilizer bar 310 and long stabilizer bar 320 are constrained to each other via the coupling interface 330.

Figure 7D:
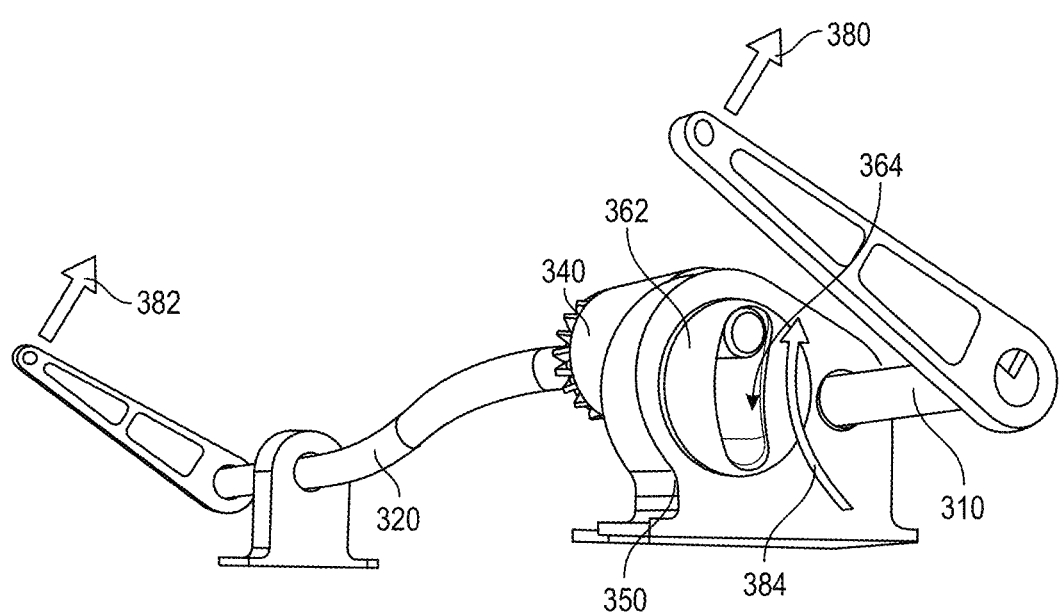

FIG. 7D shows motion in the opposite direction. In this regard, a force exerted on the short stabilizer bar 310 in a second direction (opposite the first direction) shown by arrow 380 results in a corresponding force in the first direction shown by arrow 382 on the long stabilizer bar 320. In this regard, the force associated with arrow 380 may cause the short stabilizer bar 310 to pivot about its axis. Since the short stabilizer bar 310 is constrained to the inverter housing 340 in this (connected) state, the pivoting of the short stabilizer bar 310 about its axis also carries the inverter housing 340 to pivot in the direction of arrow 384. This pivot of the inverter housing 340 carries the axis of the long stabilizer bar 320 in the slot 364 following the direction of arrow 384 and correspondingly pivoting the long stabilizer bar 320 in the direction of arrow 382.

Figure 8A:
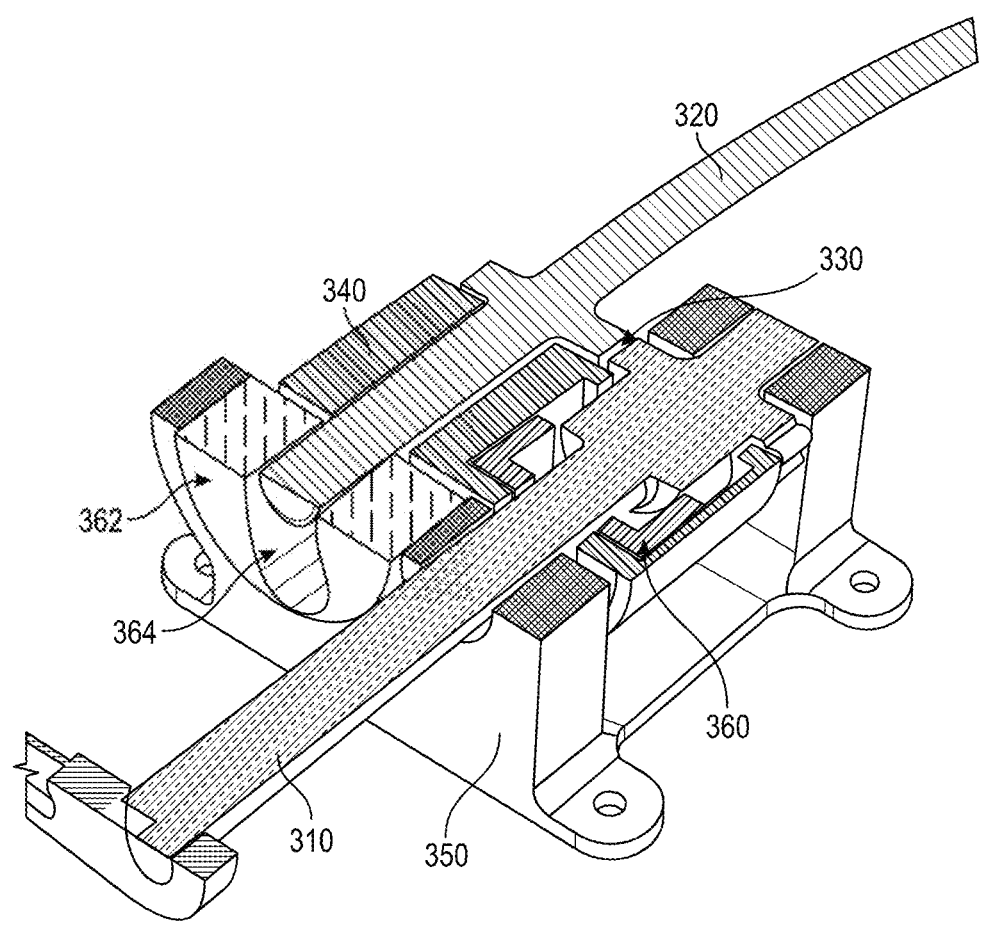
Figure 8B:
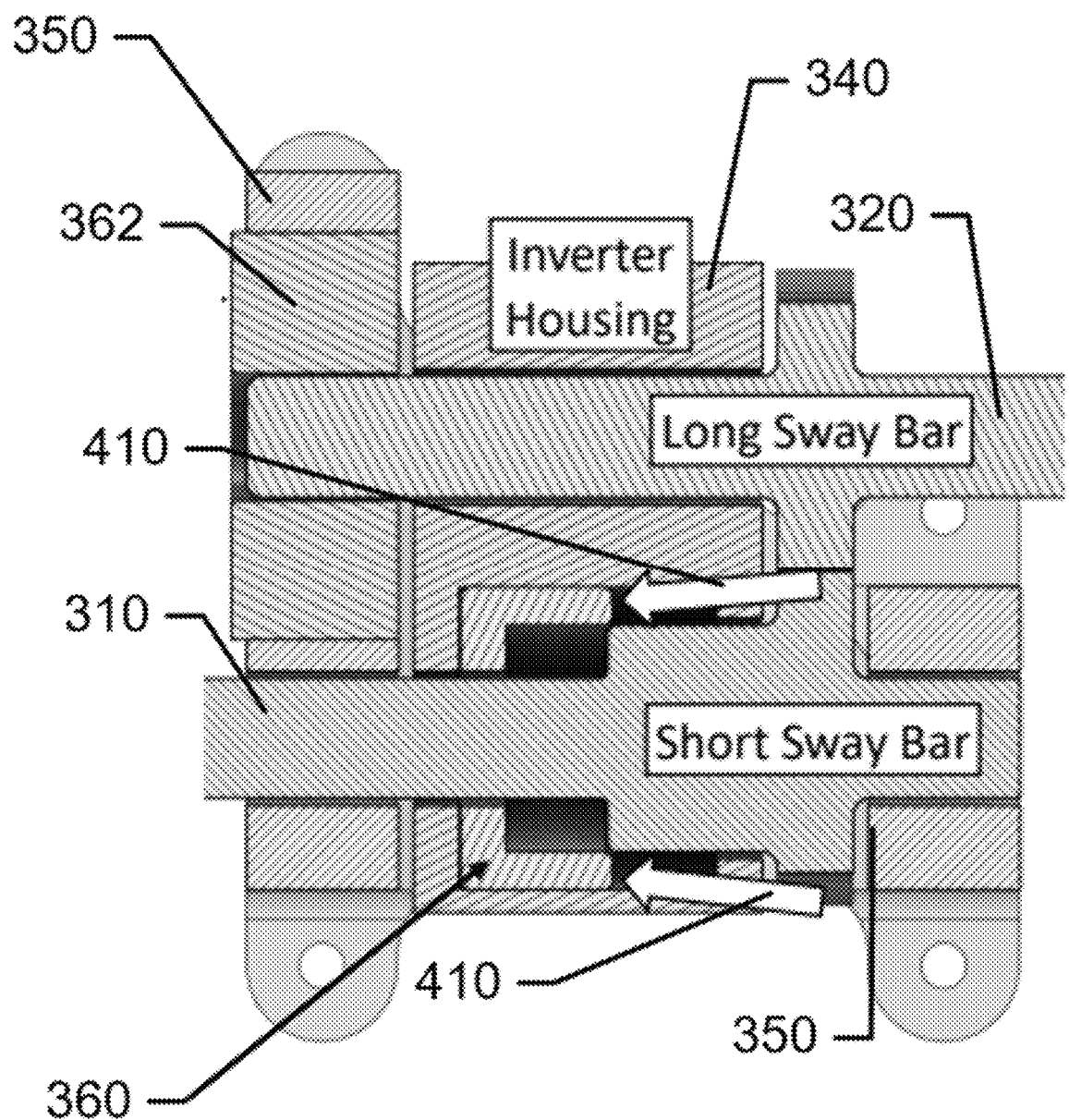

FIGS. 8A and 8B show cross section views through the chassis coupler 350, inverter housing 340, and the coupling interface 330 in the disconnected state. Referring to FIG. 8A, the second actuator 362 is positioned to leave the long stabilizer bar 320 unconstrained relative to the chassis coupler 350. Meanwhile, by moving the first actuator 360 in the direction of arrows 410, the first actuator 360 leaves the short stabilizer bar 310 unconstrained relative to the inverter housing 340 as shown in FIG. 8B.

Figure 8C:
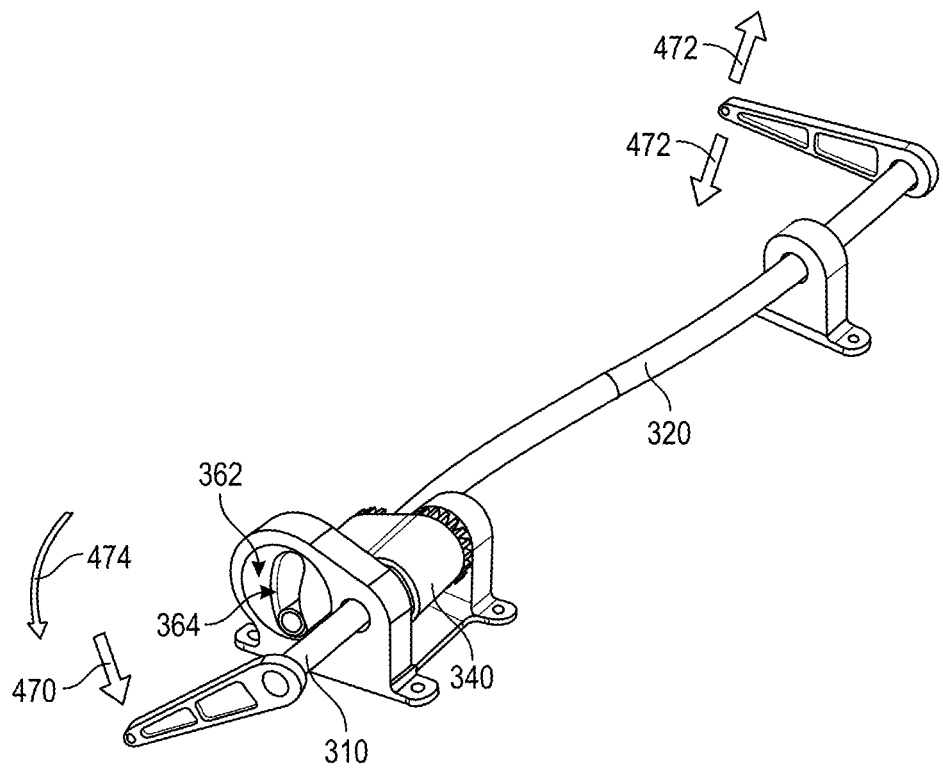
Figure 8D:
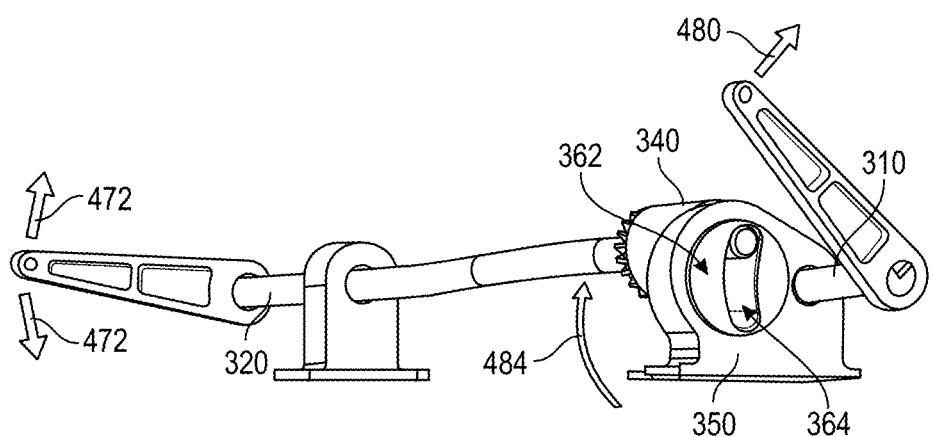

When the second actuator 362 is positioned to leave the long stabilizer bar 320 unconstrained relative to the chassis coupler 350 while the first actuator 360 also leaves the short stabilizer bar 310 unconstrained to the inverter housing 340, a force exerted on the short stabilizer bar 310 in a first direction shown by arrow 470 is not necessarily transmitted through to the long stabilizer bar 320 since the inverter housing 340 and the chassis coupler 350 are not constrained relative to the stabilizer bars. Thus, movement in either the first or the second direction (shown by arrows 472) of the long stabilizer bar 320 can result regardless of the force on the short stabilizer bar 310 since the long stabilizer bar 320 can move in the slot 364, and since the inverter housing 340 is free to pivot (due to the inverter housing 340 not being constrained to the short stabilizer bar 310. In this regard, the unconstrained nature of the inverter housing 340 and the stabilizer bars enables freedom of movement of the inverter housing 340 relative to the chassis coupler 350 (via slot 364) to enable movement in the first direction shown by arrow 470 or second direction show by arrow 480 to not be passed on to the long stabilizer bar 320. Instead, the second stabilizer bar 320 can ride up or down in the slot 364 (as shown by arrows 474 and 484 due to pivoting of the inverter housing 340 as shown in FIGS. 8C and 8D).

Figure 9A:
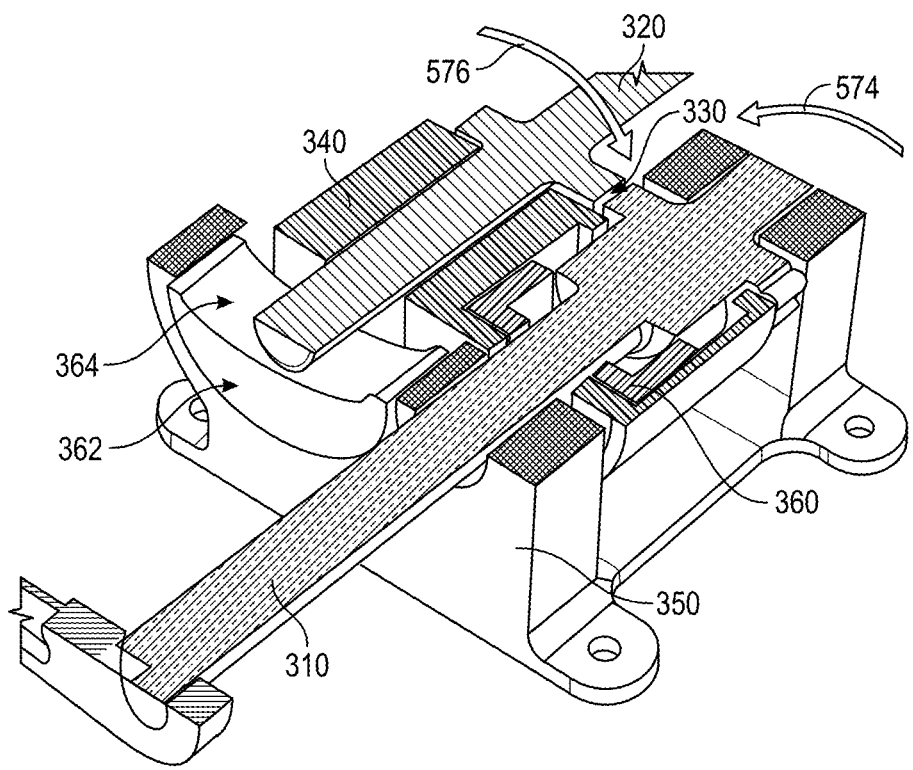
Figure 9B:
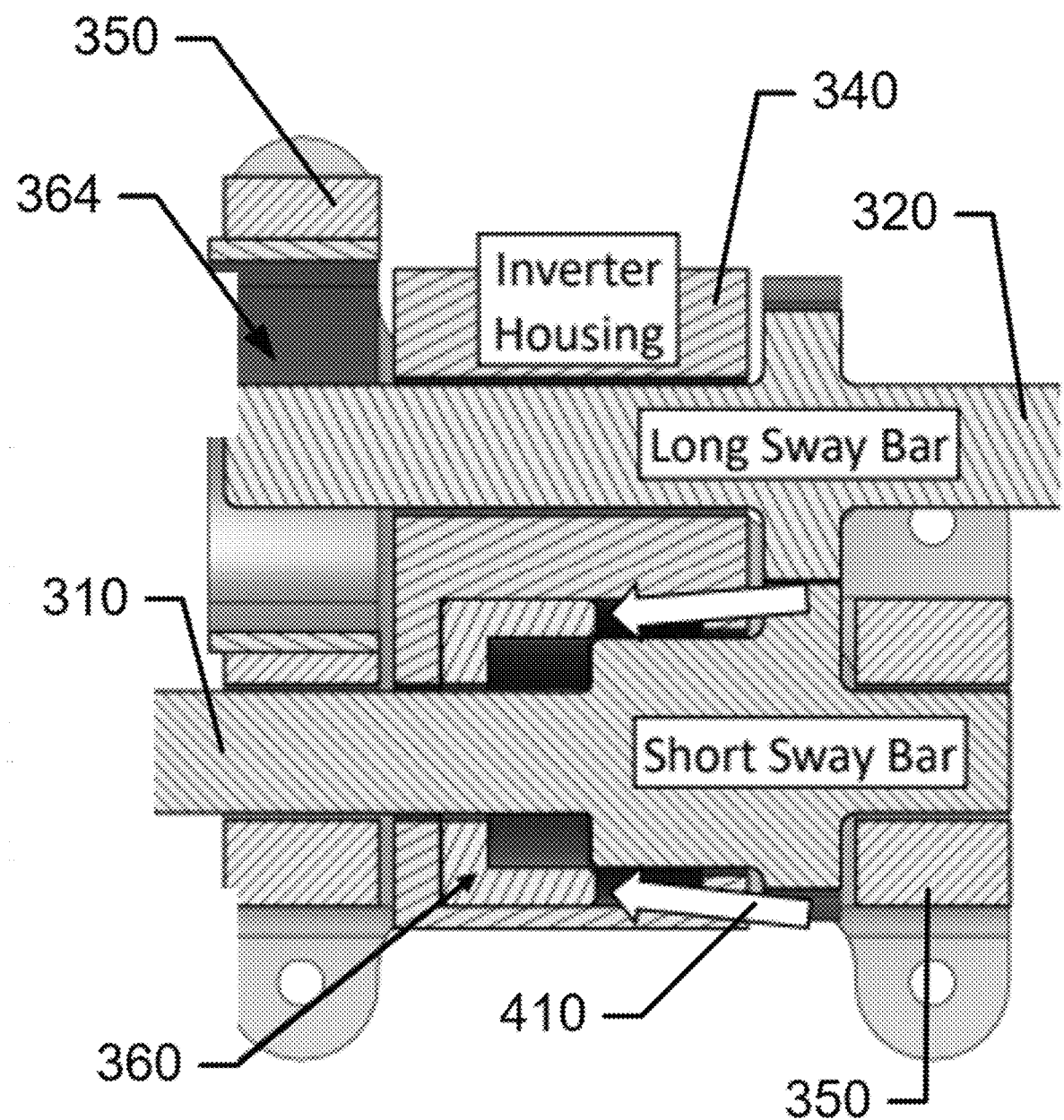

FIGS. 9A and 9B show cross section views through the chassis coupler 350, inverter housing 340, and the coupling interface 330 in the inverted state. Referring to FIG. 9A, the second actuator 362 is positioned to constrain the long stabilizer bar 320 relative to the chassis coupler 350. In this regard, the second actuator 362 is pivoted about 90 degrees so that the slot 364 extends substantially parallel to the ground (instead of perpendicular). This maintains the axis of the long stabilizer bar 320 fixed (whereas the axis was moveable when the long stabilizer bar 320 is not constrained relative to the chassis coupler 350. Meanwhile, the first actuator 360 is also not constrained to the inverter housing 340 as shown in FIG. 9B.

Figure 9C:
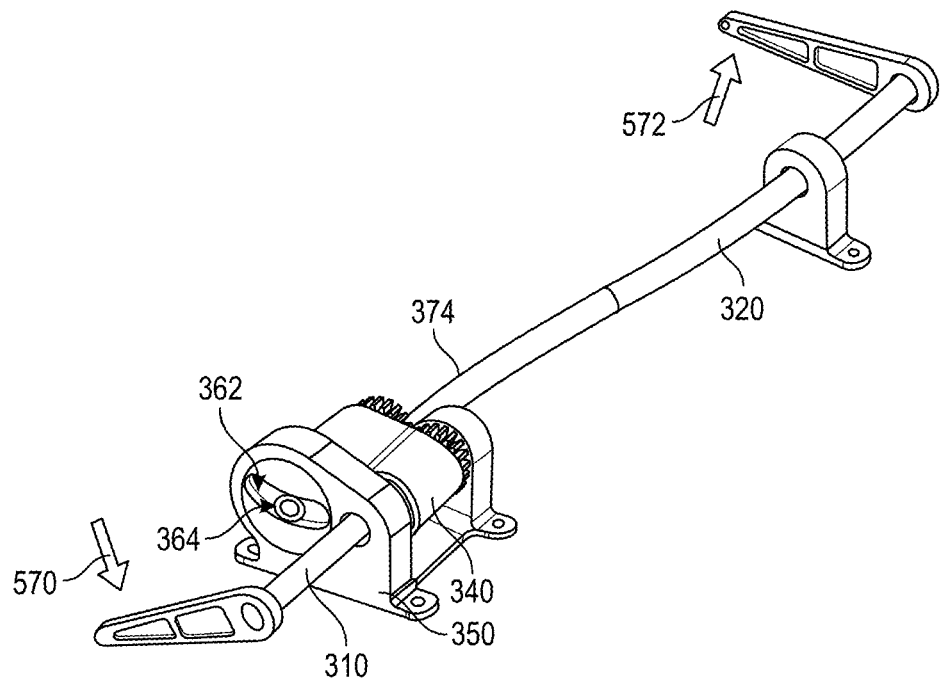
Figure 9D:
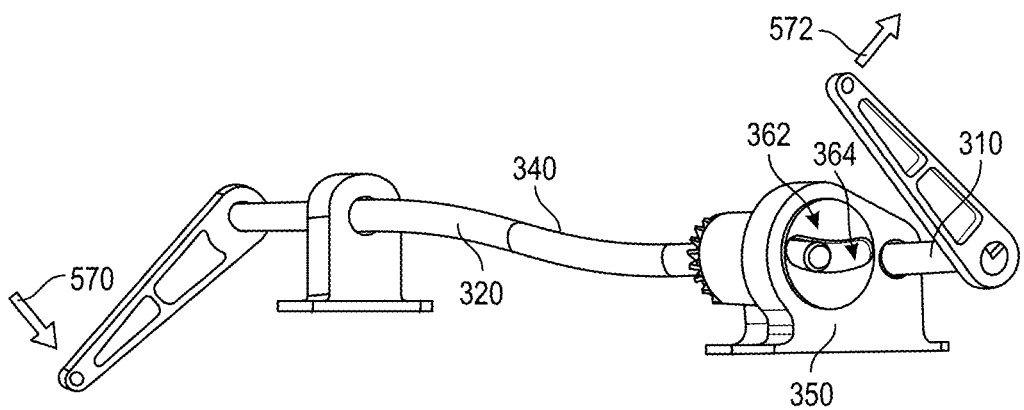

When the second actuator 362 is positioned to constrain the long stabilizer bar 320 relative to the chassis coupler 350 while the first actuator 360 is positioned such that the short stabilizer bar 310 is not constrained relative to the inverter housing 340, a force exerted on the short stabilizer bar 310 in a first direction shown by arrow 570 results in a corresponding force in a second direction (opposite the first direction) shown by arrow 572 on the long stabilizer bar 320. In this regard, the force associated with arrow 570 may cause the short stabilizer bar 310 to pivot about its axis. Since the short stabilizer bar 310 is unconstrained relative to the inverter housing 340 in this (inverted) state, the pivoting of the short stabilizer bar 310 about its axis in the direction of arrow 574 also carries the long stabilizer bar 320 to pivot in the direction of arrow 576, since the short stabilizer bar 310 and long stabilizer bar 320 are constrained to each other via the coupling interface 330. This pivoting of the short and long stabilizer bars 310 and 320, since no other freedom of movement is afforded by the constrained nature of the chassis coupler 350 to the inverter housing 340) results in movement in opposite directions for the short and long stabilizer bars 310 and 320, respectively, as shown in FIGS. 9C and 9D by arrows 570 and 572.

In the examples above, the first actuator 360 is operably coupled to the short stabilizer bar 310 and the inverter housing 340 to alternately constrain the short stabilizer bar 310 to the inverter housing 340 or enable movement of the short stabilizer bar 310 relative to the inverter housing 340 based on a position of the first actuator 360. The second actuator 362 is operably coupled to the chassis coupler 350 to alternately constrain the chassis coupler 350 to the inverter housing 340 or enable movement of the inverter housing 340 relative to the chassis coupler 350 (by enabling or disabling movement of an axis of the long stabilizer bar 320 in the slot 364) based on a position of the second actuator 362. In the example described above, the first actuator 360 is positioned to move axially with respect to the short stabilizer bar 310 to constrain the short stabilizer bar 310 to the inverter housing 340, and the second actuator 362 pivots about an axis of the long stabilizer bar 320 to constrain the chassis coupler 350 to the inverter housing 340. Thus, for example, the second actuator 32 may be positioned in either of two constraining positions, one rotated roughly 90 degrees clockwise and the other roughly 90 degrees counterclockwise. Although in the examples above, the first stabilizer bar 140 (e.g., short stabilizer bar 310) is shorter than the second stabilizer bar 150 (e.g., long stabilizer bar 320), the stabilizer bars could alternatively have the same length (or be swapped in terms of relative lengths).

The examples described above show one way in which the functional capabilities described in reference to FIGS. 2-5 can be implemented in specific structural componentry. However, other structures are alternatively possible. For example, instead of having two actuators that operate as described above to achieve the three separate states or configurations, the actuator assembly 230 of FIG. 2 could be a single actuator with three distinct positions (as shown in the example of FIG. 11) that correspond to each respective state. FIG. 10 illustrates components of an alternative structure for a stabilizer assembly 600 that may be used to implement example embodiments. In this regard, FIG. 10, which is defined by FIGS. 10A, 10B, 10C, 10D and 10E, shows various different views of the stabilizer assembly 600. In FIG. 10, the mechanical interface forming the coupling interface 200 of FIG. 2 is a Watt's link interface 630. Otherwise, although structurally different, the example of FIG. 10 operates similar to the examples above.

Figure 10A:
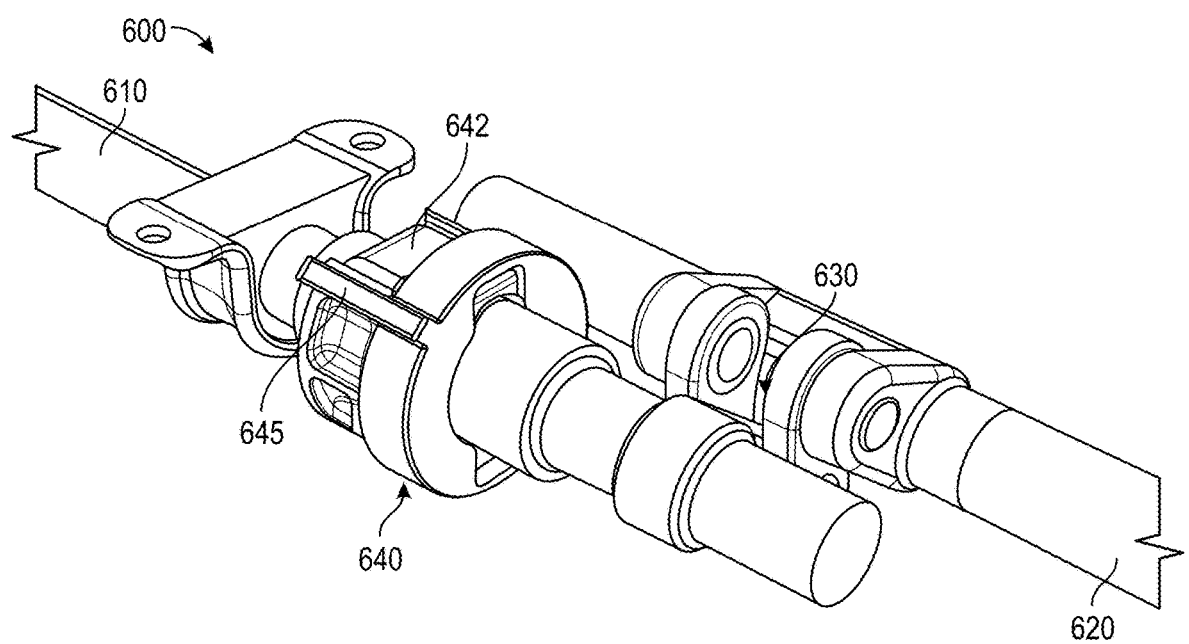
Figure 10B:
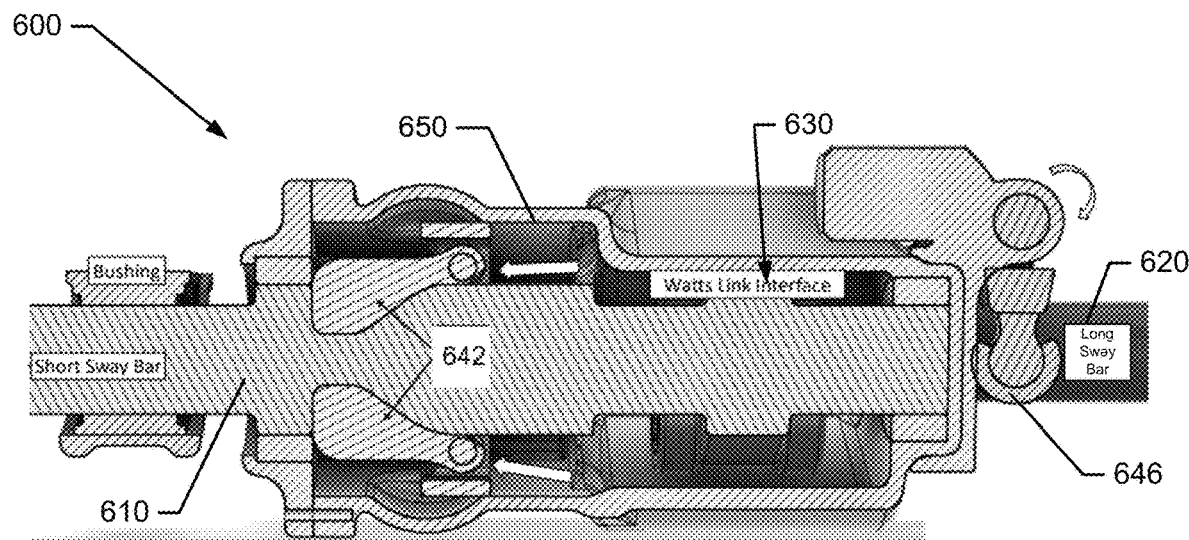
Figures 10C, 10D:
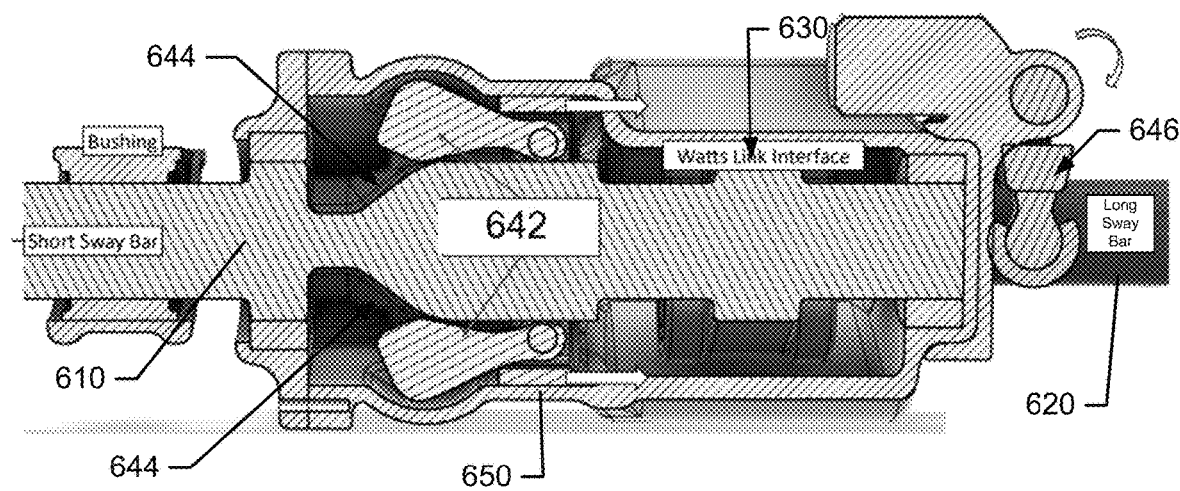
Figure 10E:
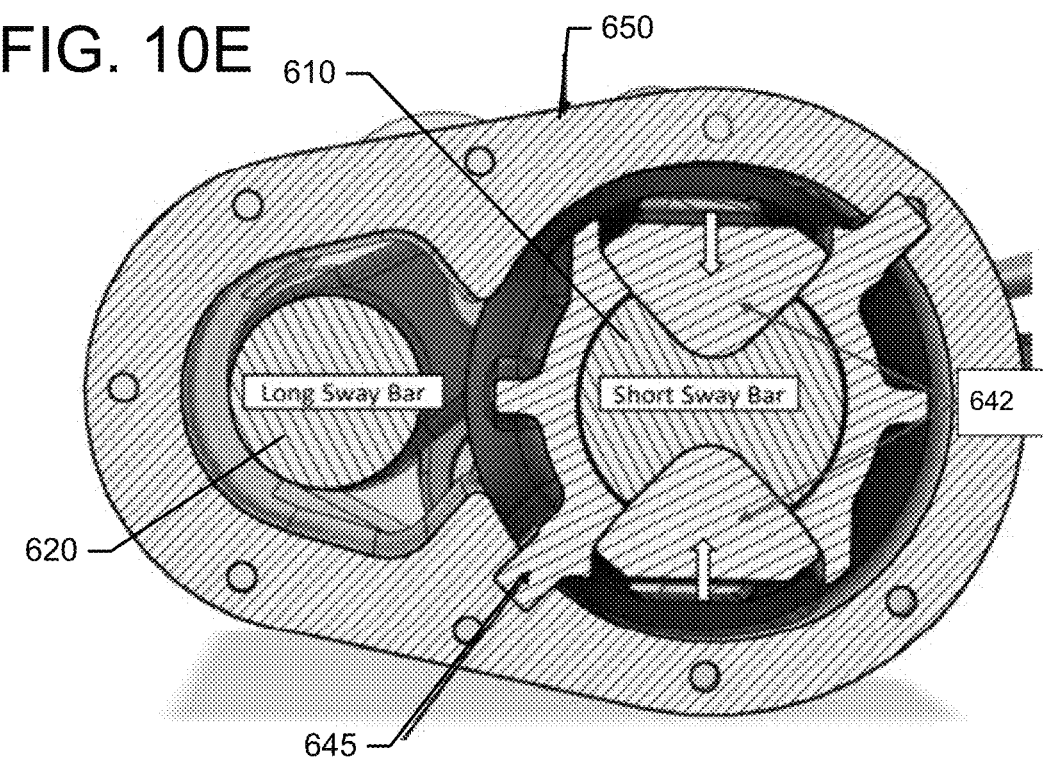
Figure 10F:
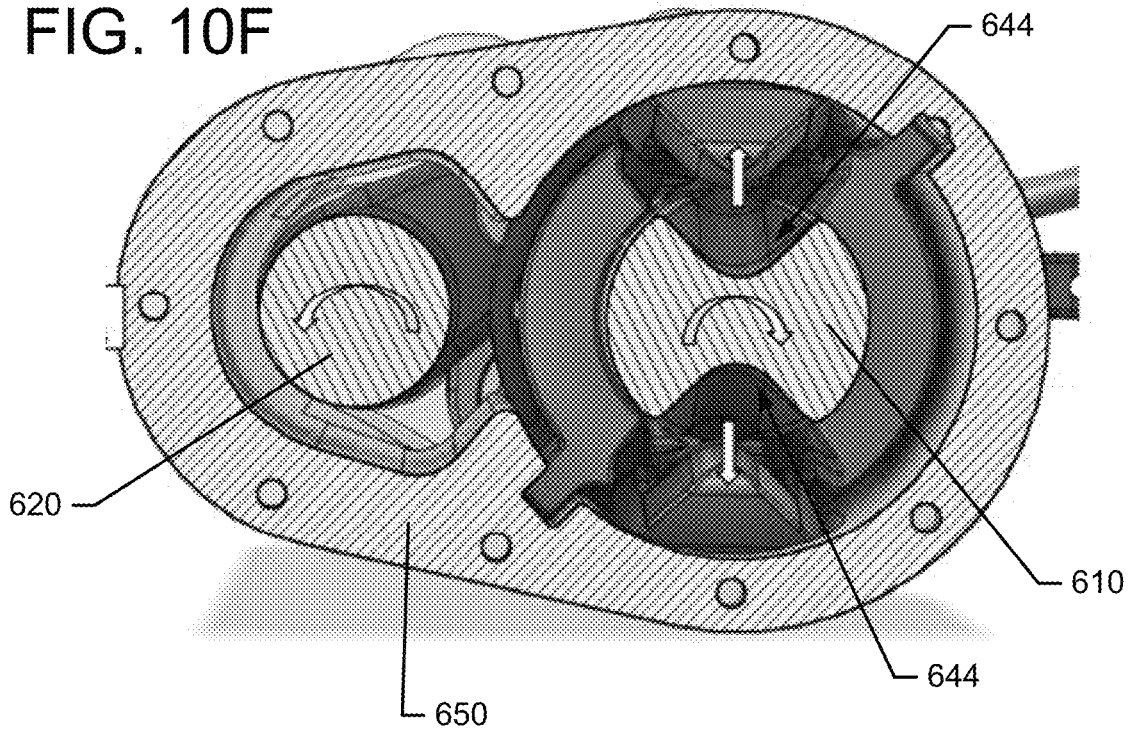

FIG. 10A shows a perspective view of the stabilizer assembly 600 with housing components removed. FIGS. 10B, 10C and 10D show cross section views taken through the axis of the first stabilizer bar 610, and FIGS. 10E and 10F show cross section views taken perpendicular to the axis and through an actuator engagement portion of the first stabilizer bar 610. The first stabilizer bar 610 is shown operably coupled to the second stabilizer bar 620 via Watt's link interface 630. The first actuator 640 is embodied by a set of pawls 642 that either engage slots 644 formed in the first stabilizer bar 610 (when constrained as shown in FIGS. 10A, 10B and 10E) or do not engage the slots 644 (when unconstrained as shown in FIGS. 10C, 10D and 10F). Splines 645 may engage the inverter housing 650 to constrain the inverter housing 650 to the first actuator 640, and thus the first stabilizer bar 610 (via the pawls 642). The second actuator 646 is embodied as a draglink that rotates to be on the first stabilizer bar 610 axis when unconstrained (shown in FIGS. 10B and 10C) or off axis when constrained (as shown in FIG. 10D).

Similar to the descriptions above, the second actuator 646 and the first actuator 640 are each positioned to leave respective components unconstrained to define the disconnected state in FIG. 10C. Meanwhile, in FIG. 10B, the first stabilizer bar 610 is constrained to the inverter housing 650 to define the connected state. Finally, in FIG. 10D, the first stabilizer bar 610 is unconstrained relative to the inverter housing 650, but the inverter housing 650 is constrained by the second actuator 646 as it is rotated out of the axis of the stabilizer bars. This leaves the first and second stabilizer bars 610 and 20 constrained to their respective axes and coupled via the coupling interface (e.g., Watt's link interface 630) to define the inverted state. Example embodiments may be structured in many different ways, as noted above. However, in each instance, it is desirable for the actuator assembly to be operable while under load.

Figure 11A:
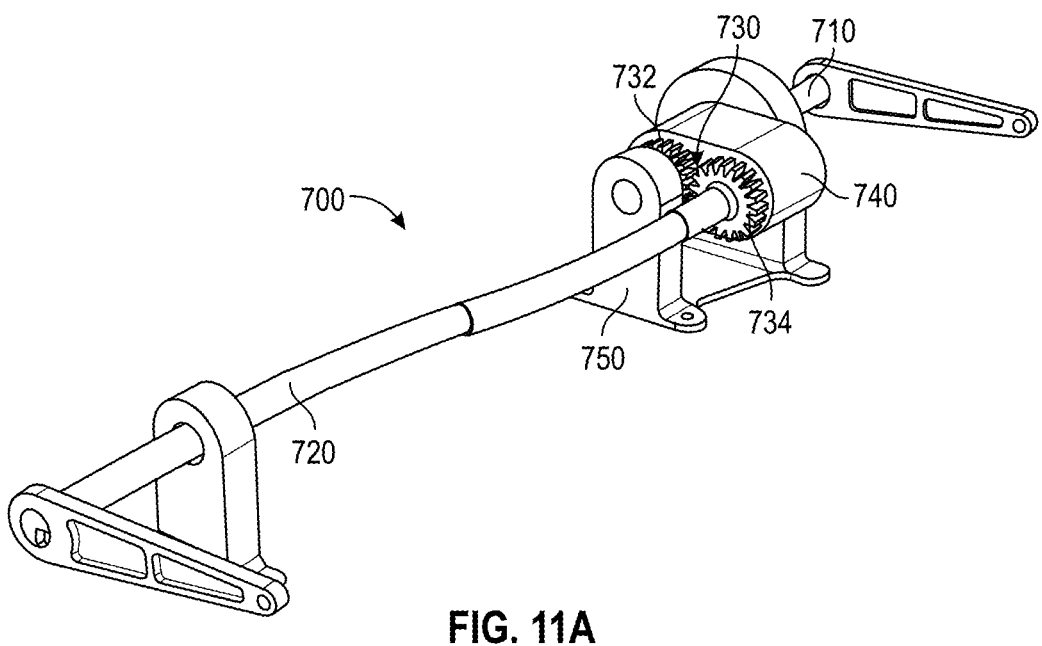

As noted above, a single, three-position actuator assembly 230 may be employed in some cases. FIG. 11, which is defined by FIGS. 11A, 11B, 11C and 11D, illustrates a perspective view of such an actuator. Referring first to FIG. 11A, the stabilizer assembly 700 includes a short stabilizer bar 710 and a long stabilizer bar 720. Each of the short and long stabilizer bars 710 and 720 may be operably coupled to the chassis of the vehicle, and to each other via a coupling interface 730. The coupling interface 730 of this example includes a first fixed gear 732 at the short stabilizer bar 710 and a second fixed gear 734 at the long stabilizer bar 720.

Figure 11B:
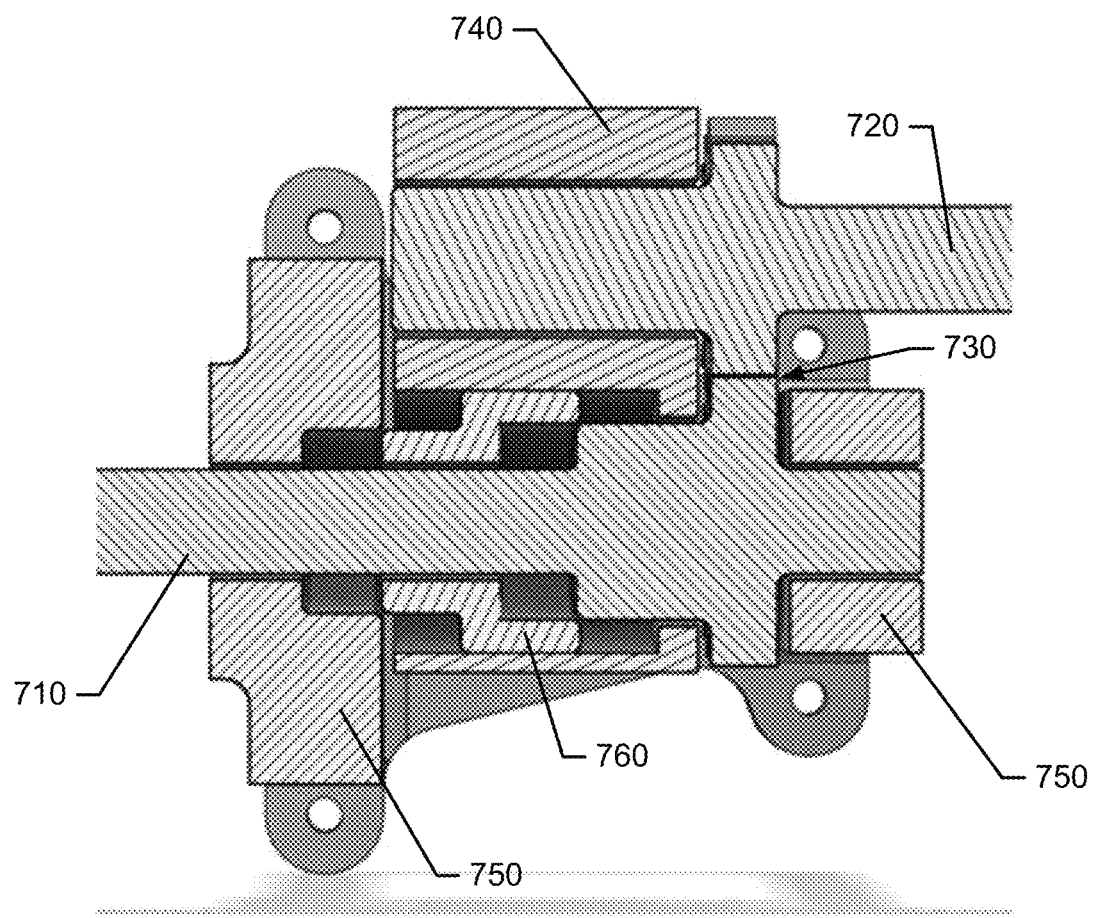
Figure 11D:
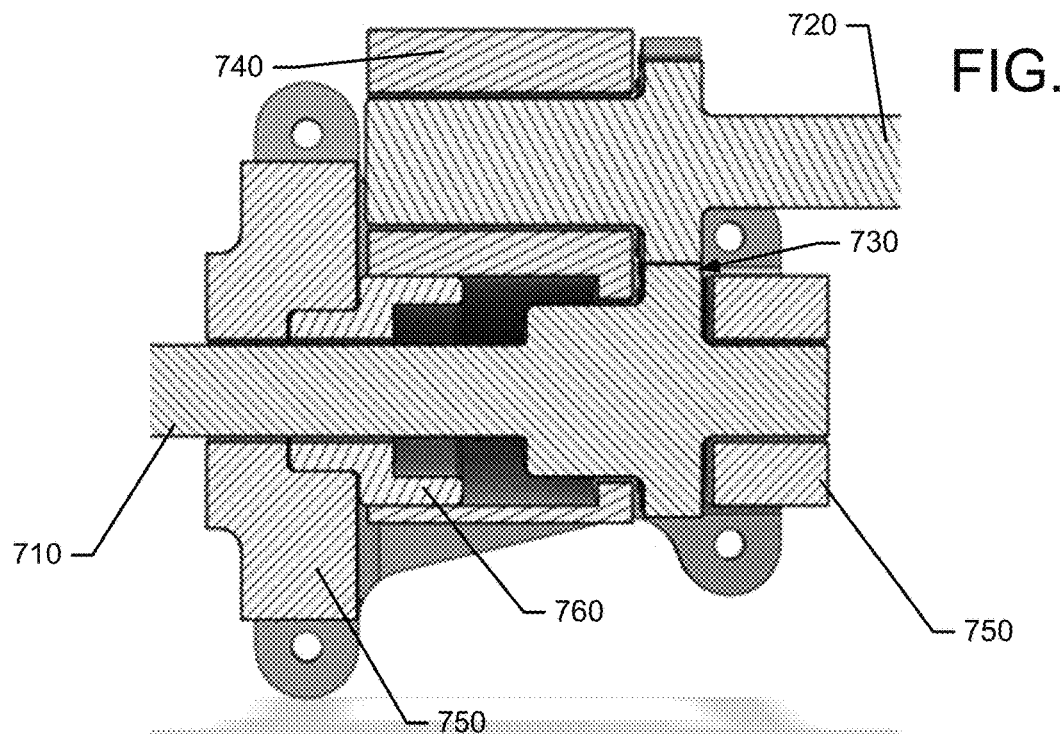
Figure 11C:
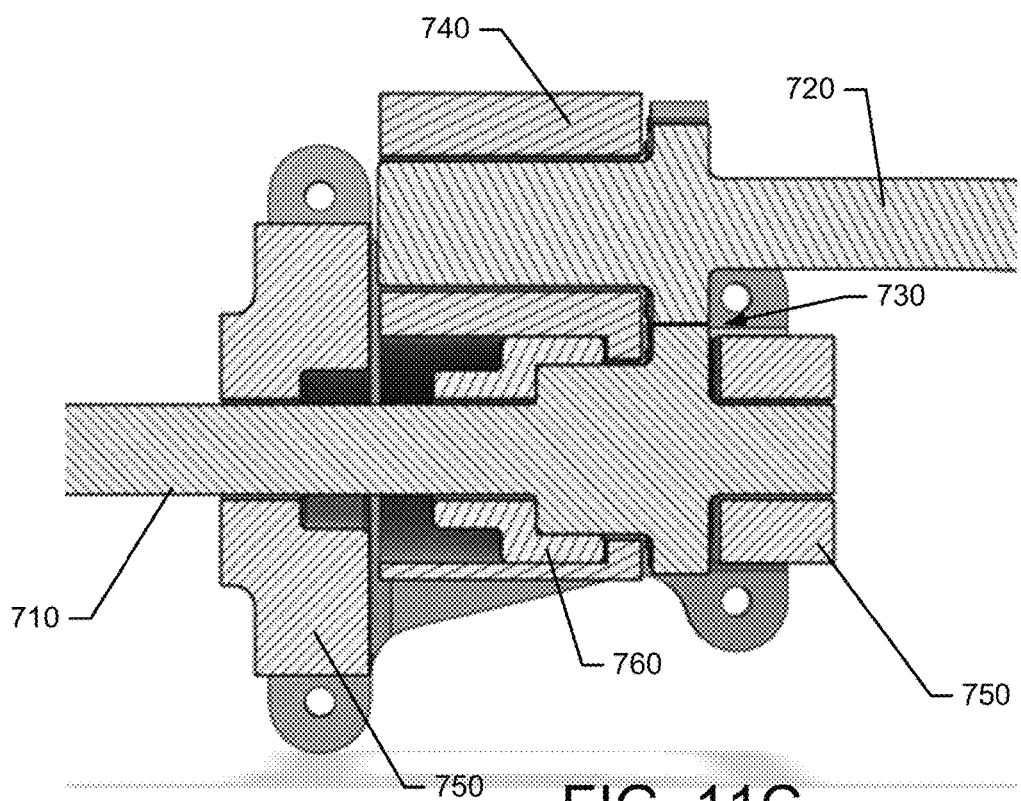

The coupling interface 730, and particularly the first and second fixed gears 732 and 734, may be provided within inverter housing 740. In this regard, the inverter housing 740 may effectively keep the first and second fixed gears 732 and 734 in contact with each other as noted above. The inverter housing 740 may also be provided proximate to, or within, chassis coupler 750. As shown in FIG. 11, a three-position actuator 760 may be provided to define the connected, disconnected and inverted states, which may function as described above based only on the repositioning of the three-position actuator 760. FIG. 11B shows the actuator 760 in the disconnected state since the actuator 760 does not constrain the inverter housing to the short stabilizer bar 710 or the chassis coupler 750. However, in FIG. 11C, the actuator 760 is moved so that splines or other engagement features on the actuator 760 may engage (and constrain) the short stabilizer bar 710 to the inverter housing 740 to define the connected state. Meanwhile, in FIG. 11D, the actuator 760 is moved to constrain the inverter housing 740 to the chassis coupler 750 to define the inverted state.

A suspension assembly for an improved vehicle suspension system may therefore be provided. The suspension assembly may include a first stabilizer bar operably coupled to a first wheel on a first side of the vehicle, a second stabilizer bar operably coupled to a second wheel on a second side of the vehicle, an inverter housing, an actuator assembly, and a chassis coupler. The actuator assembly may be operable to arrange the first stabilizer bar and the second stabilizer bar in a selected one of a connected state, a disconnected state, and an inverted state. The inverter housing may be alternately constrained to one of the first stabilizer bar or the chassis coupler based on a position of the actuator assembly to define each of the connected state, the disconnected state and the inverted state.

The suspension assembly of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the first and second stabilizer bars may be operably coupled to each other via a coupling interface within the inverter housing. The inverter housing may be operably coupled to the chassis coupler to be moveable relative to the chassis coupler when unconstrained and be immovable relative to the chassis coupler when constrained relative to the assembly housing. The inverter housing may be alternately constrained or unconstrained based on a position of the actuator assembly. In an example embodiment, the coupling interface may include a first fixed gear at the first stabilizer bar and a second fixed gear at the second stabilizer bar, and the first and second fixed gears may have a 1:1 ratio. In some cases, the coupling interface may include a mechanical interface at each of the first stabilizer bar the second stabilizer bar, and the mechanical interface may have a net 1:1 ratio. In an example embodiment, the actuator assembly may include a first actuator and a second actuator. In some cases, the first actuator may be operably coupled to the first stabilizer bar and the inverter housing to alternately constrain the first stabilizer bar to the inverter housing or enable movement of the first stabilizer bar relative to the inverter housing based on a position of the first actuator. The second actuator may be operably coupled to the chassis coupler to alternately constrain the chassis coupler to the inverter housing or enable movement of the inverter housing relative to the chassis coupler based on a position of the second actuator. In an example embodiment, in the connected state, the first actuator constrains the first stabilizer bar to the inverter housing. In the connected state, an input force applied to either one of the first stabilizer bar or the second stabilizer bar in a first direction is transmitted as an output at the other of the second stabilizer bar or the first stabilizer bar in the first direction. In an example embodiment, in the disconnected state, neither the first actuator constrains the first stabilizer bar to the inverter housing nor the second actuator constrains the chassis coupler to the inverter housing. In the disconnected state, an input force applied to either one of the first stabilizer bar or the second stabilizer bar in a first direction is not transmitted as an output at the other of the second stabilizer bar or the first stabilizer bar. In an example embodiment, in the inverted state, the second actuator constrains the inverter housing to the assembly housing. In the inverted state, an input force applied to either one of the first stabilizer bar or the second stabilizer bar in a first direction is transmitted as an output at the other of the second stabilizer bar or the first stabilizer bar in a second direction opposite the first direction. In an example embodiment, the first actuator may move axially with respect to the first stabilizer bar to constrain the first stabilizer bar to the inverter housing, and the second actuator may pivot about an axis of the second stabilizer bar to constrain the chassis coupler to the inverter housing. In some cases, the actuator assembly may be operable hydraulically, pneumatically, or electrically. In an example embodiment, the first stabilizer bar may be shorter than the second stabilizer bar. In some cases, the actuator assembly may be operable under load.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A stabilizer assembly for a vehicle, the stabilizer assembly comprising:
    a first stabilizer bar operably coupled to a first wheel on a first side of the vehicle, the first stabilizer bar comprising a first gear that rotates with the first stabilizer bar;
    a second stabilizer bar operably coupled to a second wheel on a second side of the vehicle, the second stabilizer bar comprising a second gear that rotates with the second stabilizer bar;
    an inverter housing;
    an actuator assembly; and
    a chassis coupler;
    wherein the actuator assembly is operable to arrange the first stabilizer bar and the second stabilizer bar in a selected one of a connected state, a disconnected state, and an inverted state;
    wherein the inverter housing is alternately constrained to one of the first stabilizer bar or the chassis coupler based on a position of the actuator assembly to define each of the connected state, the disconnected state, and the inverted state;
    wherein the first gear and the second gear are configured to be in a meshed engagement when the first stabilizer bar and the second stabilizer bar are in the connected state, the disconnected state, and the inverted state.

2. The stabilizer assembly of claim 1, wherein the inverter housing is operably coupled to the chassis coupler to be moveable relative to the chassis coupler when unconstrained and be immovable relative to the chassis coupler when constrained relative to the inverter housing, and
    wherein the inverter housing is alternately constrained or unconstrained based on a position of the actuator assembly.

3. The stabilizer assembly of claim 2, wherein the first gear and the second gear have a 1:1 ratio.

4. The stabilizer assembly of claim 1, wherein the actuator assembly comprises a first actuator and a second actuator.

5. The stabilizer assembly of claim 4, wherein the first actuator is operably coupled to the first stabilizer bar and the inverter housing to alternately constrain the first stabilizer bar to the inverter housing or enable movement of the first stabilizer bar relative to the inverter housing based on a position of the first actuator, and
    wherein the second actuator is operably coupled to the chassis coupler to alternately constrain the chassis coupler to the inverter housing or enable movement of the inverter housing relative to the chassis coupler based on a position of the second actuator.

6. The stabilizer assembly of claim 5, wherein, in the connected state, the first actuator constrains the first stabilizer bar to the inverter housing.

7. The stabilizer assembly of claim 6, wherein an input force applied to either one of the first stabilizer bar or the second stabilizer bar in a first direction is transmitted as an output at the other of the second stabilizer bar or the first stabilizer bar in the first direction.

8. The stabilizer assembly of claim 5, wherein, in the disconnected state, neither the first actuator constrains the first stabilizer bar to the inverter housing nor the second actuator constrains the chassis coupler to the inverter housing.

9. The stabilizer assembly of claim 8, wherein an input force applied to either one of the first stabilizer bar or the second stabilizer bar in a first direction is not transmitted as an output at the other of the second stabilizer bar or the first stabilizer bar.

10. The stabilizer assembly of claim 5, wherein, in the inverted state, the second actuator constrains the inverter housing to the chassis coupler.

11. A stabilizer assembly for a vehicle, the stabilizer assembly comprising:
    a first stabilizer bar operably coupled to a first wheel on a first side of the vehicle;
    a second stabilizer bar operably coupled to a second wheel on a second side of the vehicle;

an inverter housing;
an actuator assembly; and
a chassis coupler;
  wherein the actuator assembly is operable to arrange the first stabilizer bar and the second stabilizer bar in a selected one of a connected state, a disconnected state, and an inverted state;
  wherein the inverter housing is alternately constrained to one of the first stabilizer bar or the chassis coupler based on a position of the actuator assembly to define each of the connected state, the disconnected state, and the inverted state;
  wherein the actuator assembly further comprises a draglink coupled between the first stabilizer bar and the second stabilizer bar and rotatable between a draglink constrained position and a draglink unconstrained position, wherein, when the draglink is in the draglink constrained position, the draglink is off-axis with the first stabilizer bar to implement the connected state or the disconnected state, and wherein, when the draglink is in the draglink unconstrained position, the draglink is on-axis with the first stabilizer bar to implement the inverted state.

12. The stabilizer assembly of claim 11, wherein the draglink is a component of a mechanical coupling interface between the first stabilizer bar the second stabilizer bar, and wherein the mechanical coupling interface has a net 1:1 ratio.

13. The stabilizer assembly of claim 11, wherein the inverter housing is operably coupled to the chassis coupler to be moveable relative to the chassis coupler when unconstrained and be immovable relative to the chassis coupler when constrained relative to the inverter housing, and
  wherein the inverter housing is alternately constrained or unconstrained based on a position of the actuator assembly.

14. The stabilizer assembly of claim 11, wherein the actuator assembly comprises a first actuator and a second actuator, wherein the second actuator comprises the draglink.

15. The stabilizer assembly of claim 14, wherein the first actuator is operably coupled to the first stabilizer bar and the inverter housing to alternately constrain the first stabilizer bar to the inverter housing or enable movement of the first stabilizer bar relative to the inverter housing based on a position of the first actuator, and
  wherein the second actuator is operably coupled to the chassis coupler to alternately constrain the chassis coupler to the inverter housing or enable movement of the inverter housing relative to the chassis coupler based on a position of the second actuator.

16. The stabilizer assembly of claim 15, wherein, in the connected state, the first actuator constrains the first stabilizer bar to the inverter housing.

17. The stabilizer assembly of claim 16, wherein an input force applied to either one of the first stabilizer bar or the second stabilizer bar in a first direction is transmitted as an output at the other of the second stabilizer bar or the first stabilizer bar in the first direction.

18. The stabilizer assembly of claim 15, wherein, in the disconnected state, neither the first actuator constrains the first stabilizer bar to the inverter housing nor the second actuator constrains the chassis coupler to the inverter housing.

19. The stabilizer assembly of claim 18, wherein an input force applied to either one of the first stabilizer bar or the second stabilizer bar in a first direction is not transmitted as an output at the other of the second stabilizer bar or the first stabilizer bar.

20. The stabilizer assembly of claim 15, wherein, in the inverted state, the second actuator constrains the inverter housing to the chassis coupler.

* * * * *